(12) United States Patent
Palanki et al.

(10) Patent No.: US 9,819,455 B2
(45) Date of Patent: *Nov. 14, 2017

(54) ACKNOWLEDGMENT BASED ON SHORT CELL RADIO NETWORK TEMPORARY IDENTIFIER

(71) Applicant: QUALCOMM Incorporated, San Diego, CA (US)

(72) Inventors: Ravi Palanki, Cupertino, CA (US); Alexei Y. Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/388,247

(22) Filed: Dec. 22, 2016

(65) Prior Publication Data
US 2017/0104559 A1 Apr. 13, 2017

Related U.S. Application Data

(63) Continuation of application No. 12/580,136, filed on Oct. 15, 2009, now Pat. No. 9,537,613.
(Continued)

(51) Int. Cl.
*H04W 4/00* (2009.01)
*H04L 1/18* (2006.01)
(Continued)

(52) U.S. Cl.
CPC .......... *H04L 1/1893* (2013.01); *H04B 7/024* (2013.01); *H04L 1/0025* (2013.01);
(Continued)

(58) Field of Classification Search
CPC .......... H04L 1/1893; H04L 2001/0097; H04B 7/024; H04W 72/042; H04W 72/0413
(Continued)

(56) References Cited

U.S. PATENT DOCUMENTS 6,233,248 B1  5/2001  Sautter et al.
7,031,309 B1  4/2006  Sautter et al.
(Continued)

FOREIGN PATENT DOCUMENTS

CN  101247171 A  8/2008
EP  1959706  8/2008
(Continued)

OTHER PUBLICATIONS

Ericsson, "Lte-Advanced - Coordinated Multipoint transmission/reception" 3GPP Draft; R1-083069 {Comp}, 3RD Generation Partnership Project (3GPP), Mobile Competence Centre ; 650, Route Des Lucioles ; F-06921 Sophia-Antipolis Cedex France, no. Jeju; 20080813, 13 Aug. 2008 (2008-08-13), XP050316512.
(Continued)

*Primary Examiner* — Faisal Choudhury
(74) *Attorney, Agent, or Firm* — Norton Rose Fulbright LLP

(57) ABSTRACT

Systems and methodologies are described that facilitate identifying resources upon which an acknowledgment can be sent or received in a wireless communication environment that leverages coordinated multi-point (CoMP). The resources can be identified based upon a criterion that can be identifiable to a non-anchor cell base station (as well as an anchor cell base station, a mobile device, etc.). The criterion can be an identifier corresponding to a mobile device, where the identifier maps to a predetermined set of resources. Examples of the identifier can include a media access control identifier (MACID), a cell radio network temporary identifier (C-RNTI), a short C-RNTI, etc. Further, the criterion can be physical resources corresponding to a transmission, where the acknowledgment is responsive to the transmission. Moreover, the acknowledgment can be sent or received in connection with a cooperation technique (e.g.,
(Continued)

joint transmission via inter-site packet sharing, cooperative beamforming, cooperative silence, . . . ).

30 Claims, 13 Drawing Sheets

Related U.S. Application Data

(60) Provisional application No. 61/108,302, filed on Oct. 24, 2008.

(51) Int. Cl.
*H04L 1/00* (2006.01)
*H04B 7/024* (2017.01)
*H04W 72/04* (2009.01)

(52) U.S. Cl.
CPC ......... *H04L 1/1887* (2013.01); *H04W 72/042* (2013.01); *H04W 72/0413* (2013.01); *H04L 2001/0097* (2013.01)

(58) Field of Classification Search
USPC ....................................................... 370/328
See application file for complete search history.

(56) References Cited

U.S. PATENT DOCUMENTS

| | | | |
|---|---|---|---|
| 2006/0104334 A1 | 5/2006 | Hervey et al. | |
| 2007/0021096 A1 | 1/2007 | Arslan | |
| 2007/0218915 A1 | 9/2007 | Yang et al. | |
| 2007/0254662 A1 | 11/2007 | Khan et al. | |
| 2007/0254679 A1 | 11/2007 | Montojo et al. | |
| 2008/0130584 A1* | 6/2008 | Pani et al. ........ | H04W 36/0083 370/332 |
| 2008/0165724 A1 | 7/2008 | Wu et al. | |
| 2008/0165733 A1 | 7/2008 | Xiao et al. | |
| 2008/0194243 A1 | 8/2008 | Jeong et al. | |
| 2009/0016265 A1* | 1/2009 | Katayama et al. ... | H04L 1/1887 370/328 |
| 2009/0196191 A1 | 8/2009 | Fischer | |
| 2009/0238148 A1 | 9/2009 | Englund et al. | |
| 2009/0247150 A1 | 10/2009 | Fischer et al. | |
| 2009/0262681 A1 | 10/2009 | Park et al. | |
| 2009/0268693 A1* | 10/2009 | Lindh et al. ........ | H04W 72/042 370/336 |
| 2010/0027456 A1 | 2/2010 | Onggosanusi et al. | |
| 2010/0067604 A1 | 3/2010 | Bhadra et al. | |
| 2010/0080137 A1 | 4/2010 | Vedantham et al. | |
| 2010/0091678 A1 | 4/2010 | Chen et al. | |
| 2010/0091723 A1 | 4/2010 | Park et al. | |
| 2010/0098012 A1 | 4/2010 | Bala et al. | |
| 2010/0105404 A1 | 4/2010 | Palanki et al. | |
| 2010/0142466 A1 | 6/2010 | Palanki et al. | |
| 2010/0240385 A1 | 9/2010 | L hr et al. | |
| 2010/0304751 A1 | 12/2010 | Ji et al. | |
| 2011/0038329 A1 | 2/2011 | Luo et al. | |
| 2011/0069667 A1* | 3/2011 | Grovlen et al. ...... | H04W 72/14 370/329 |
| 2011/0103338 A1 | 5/2011 | Astely et al. | |
| 2011/0268208 A1 | 11/2011 | Larsson et al. | |
| 2012/0040679 A1 | 2/2012 | Worrall | |

FOREIGN PATENT DOCUMENTS

| | | |
|---|---|---|
| JP | 2009514325 A | 4/2009 |
| JP | 2010515332 A | 5/2010 |
| WO | WO-2007049998 A1 | 5/2007 |
| WO | WO-2007127945 A2 | 11/2007 |
| WO | WO-2007148930 A1 | 12/2007 |
| WO | WO-2008085000 A1 | 7/2008 |

OTHER PUBLICATIONS

Ericsson: "R1-082469: Lte-Advanced Coordinated Multipoint Transmission/Reception," (Jun. 30 - Jul. 4, 2008) Internet Citation pgs. 1-6, Retrieved on Jul. 4, 2008, XP002574186.
Huawei: "Consideration on CoMP for Lte-Advanced," 3GPP Tsg Ran WG1#54, R1-083049; Jeju, Korea, (August 22, 2008), pp. 1-3. •.
Huawei: "Inter-eNB and Intra-eNB Schemes for CoMP in Lte-Advanced", 3GPP Draft Tsg Ran Wg#54; R1-083050, 3RD Generation Partnership Project (3GPP), Jeju, Korea, (Aug. 18-22, 2008).
International Search Report-PCT/US2009/061837 - International Search Authority - European Patent Office, (Apr. 9, 2010).
Murai, H. et al: "Lte-Advanced - the Solution for Imt-Advanced," Xp-002574187, (Jun. 11, 2008), pp. 1-16.
Nokia et al., "L1 control signaling with carrier aggregation in Lte-Advanced", 3GPP Draft; R1-083730, 3RD Generation Partnership Project (3GPP), Mobile Competence Centre; 650, Route Des Lucioles; F-06921 Sophia-Antipolis Cedex; France, no. Prague, Czech Republic; 20080924, 24 Sep. 2008 (2008-09-24), 7 pp., XP050317069, [retrieved on 2008-09-24].
Qualcomm Europe: "Network Mimo for Downlink Transmission in Lte-Advanced ", 3GPP Tsg Ran WG1 Meeting #54, R1-083192, Aug. 18 - 22, 2008. •.
Taiwan Search Report - TW098136002 - Tipo - 2012-12-21 (090151TW).
US Provisional Application 61/041,227 filed on Mar. 31, 2008.
Written Opinion - PCT/US2009/061837 - Isa/Epo - 2010-04-09 (090151WO).

* cited by examiner

ACKNOWLEDGMENT BASED ON SHORT CELL RADIO NETWORK TEMPORARY IDENTIFIER

CLAIM OF PRIORITY UNDER 35 U.S.C. §119

The present application is a continuation of copending, commonly assigned, U.S. patent application Ser. No. 12/580,136, filed Oct. 15, 2009, entitled "ACKNOWLEDGMENT BASED ON SHORT CELL RADIO NETWORK TEMPORARY IDENTIFIER," which claims priority to Provisional Application No. 61/108,302 entitled "C-RNTI BASED ACK FOR SOFT HANDOFF AND N-MIMO IN OFDMA" filed Oct. 24, 2008, and assigned to the assignee hereof and hereby expressly incorporated by reference herein in its entirety.

BACKGROUND

Field

The following description relates generally to wireless communications, and more particularly to identifying resources upon which an acknowledgment (ACK) can be sent or received based upon a criterion recognizable by an anchor cell base station and a non-anchor cell base station in a wireless communication environment that employs coordinated multi-point (CoMP).

Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Traditionally, in a wireless communication network with multiple base stations and multiple mobile devices, each mobile device is typically associated with a particular one of the multiple base stations. For instance, a mobile device can be associated with a given base station as a function of various factors such as signal strength, Channel Quality Indicator (CQI), and so forth. Thus, the mobile device can be served by the given base station (e.g., uplink and downlink transmissions can be exchanged there between, . . . ), while other base stations in vicinity can generate interference.

Moreover, cooperation between base stations has become more commonly leveraged. In particular, multiple base stations in a wireless communication network can be interconnected, which can allow for sharing data between base stations, communicating there between, and so forth. For instance, in a wireless communication network deployment across a city, base stations included in the deployment can serve a set of mobile devices located within proximity of the base stations. Thus, multiple sources and/or destinations can be utilized as part of a cooperation strategy for transmission and reception of data, control signaling, and/or other information between devices in the wireless communication network. Use of multiple sources and/or destinations for respective transmissions can yield higher data rates, improved signal quality, and other such benefits. According to an example, the wireless communication network can be a network multiple-input multiple-output (N-MIMO) system or a coordinated multi-point (CoMP) system, in which a plurality of base stations can cooperate to exchange information with one or more mobile devices.

Conventionally, when multiple base stations cooperate as part of an N-MIMO system or CoMP system, non-anchor cell base stations that lack responsibility for scheduling a mobile device or exchanging control signaling with the mobile device can be unable to recognize resources that can be utilized by the mobile device for sending an acknowledgment (ACK) over an uplink. Thus, non-anchor cell base stations can typically fail to demodulate, detect, receive, etc. an acknowledgment over-the-air sent by the mobile device via the uplink. Rather, non-anchor cell base stations oftentimes obtain information concerning the acknowledgment transmitted over the uplink by the mobile device from an anchor cell base station that receives the acknowledgment over-the-air and forwards such information via a backhaul. By way of another example, non-anchor cell base stations in conventional N-MIMO or CoMP systems can commonly be unable to identify resources to employ for sending an acknowledgment over a downlink to a mobile device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating identification of resources upon which an acknowledgment can be sent or received in a wireless communication environment that leverages coordinated multi-point (CoMP). The resources can be identified based upon a criterion that can be identifiable to a non-anchor cell base station (as well as an anchor cell base station, a mobile device, etc.). The criterion can be an identifier corresponding to a mobile device, where the identifier maps to a predetermined set of resources. Examples of the identifier can include a media access control identifier (MACID), a cell radio network temporary identifier (C-RNTI), a short C-RNTI, etc. Further, the criterion can be physical resources corresponding to a transmission, where the acknowledgment is responsive to the transmission. Moreover, the acknowledgment can be sent or received in connection with a cooperation technique (e.g., joint transmission via inter-site packet sharing, cooperative beamforming, cooperative silence, . . . ).

According to related aspects, a method is described herein. The method can include identifying resources for an acknowledgment in a coordinated multi-point (CoMP) environment based upon a criterion identifiable to a non-anchor cell base station. Further, the method can include sending the acknowledgment in response to a received transmission via the resources.

Another aspect relates to a wireless communications apparatus. The wireless communications apparatus can include at least one processor. The at least one processor can be configured to receive a transmission in a coordinated multi-point (CoMP) environment where a cooperation technique is implemented. Moreover, the at least one processor can be configured to identify resources for an acknowledgment responsive to the transmission based upon a criterion identifiable to a non-anchor cell base station. Further, the at least one processor can be configured to send the acknowledgment employing the resources.

Yet another aspect relates to a wireless communications apparatus. The wireless communications apparatus can include means for receiving a transmission in a coordinated multi-point (CoMP) environment. Further, the wireless communications apparatus can include means for selecting resources to utilize for an acknowledgment to the transmission as a function of at least one of an identifier corresponding to a mobile device or physical resources associated with the transmission. Moreover, the wireless communications apparatus can include means for sending the acknowledgment in response to the transmission utilizing the resources.

Still another aspect relates to a computer program product that can comprise a computer-readable medium. The computer-readable medium can include code for causing at least one computer to receive a transmission in a coordinated multi-point (CoMP) environment that employs a cooperation technique. Moreover, the computer-readable medium can include code for causing at least one computer to select resources to utilize for an acknowledgment to the transmission as a function of at least one of an identifier corresponding to a mobile device or physical resources associated with the transmission. Further, the computer-readable medium can include code for causing at least one computer to send the acknowledgment in response to the transmission utilizing the resources.

Yet another aspect relates to an apparatus that can include a reception component that monitors a channel for a transmission. Further, the apparatus can include a resource selection component that chooses resources for an acknowledgment responsive to the transmission based upon one or more criteria identifiable by a non-anchor cell base station in a coordinated multi-point (CoMP) environment. Moreover, the apparatus can include an acknowledgment transmission component that sends the acknowledgment by employing the resources.

In accordance with other aspects, a method is described herein. The method can include recognizing resources for an acknowledgment in a coordinated multi-point (CoMP) environment based upon a criterion identifiable to a non-anchor cell base station. Further, the method can comprise monitoring the resources to detect the acknowledgment.

Another aspect relates to a wireless communications apparatus. The wireless communications apparatus can include at least one processor. The at least one processor can be configured to recognize resources for an acknowledgment in a coordinated multi-point (CoMP) environment based upon a criterion identifiable to a non-anchor cell base station. Moreover, the at least one processor can be configured to detect the acknowledgment upon the resources.

Yet another aspect relates to a wireless communications apparatus. The wireless communications apparatus can include means for identifying resources for an acknowledgment to a transmission in a coordinated multi-point (CoMP) environment as a function of at least one of an identifier corresponding to a mobile device or physical resources associated with the transmission. Further, the wireless communications apparatus can comprise means for detecting receipt of the acknowledgment upon the resources.

Still another aspect relates to a computer program product that can comprise a computer-readable medium. The computer-readable medium can comprise code for causing at least one computer to recognize resources for an acknowledgment to a transmission in a coordinated multi-point (CoMP) environment that employs a cooperation technique as a function of at least one of an identifier corresponding to a mobile device or physical resources associated with the transmission. Moreover, the computer-readable medium can include code for causing at least one computer to detect receipt of the acknowledgment upon the resources.

Yet another aspect relates to an apparatus that can include a cooperation component that coordinates operation with at least one disparate base station to effectuate one or more of joint transmission via inter-site packet sharing, cooperative beamforming, or cooperative silence in a coordinated multi-point (CoMP) environment. Further, the apparatus can include an acknowledgment demodulation component that recognizes resources for an acknowledgment based upon one or more of an identifier corresponding to a mobile device or physical resources associated with a transmission, and observes the resources to recognize whether the acknowledgment is received upon the resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
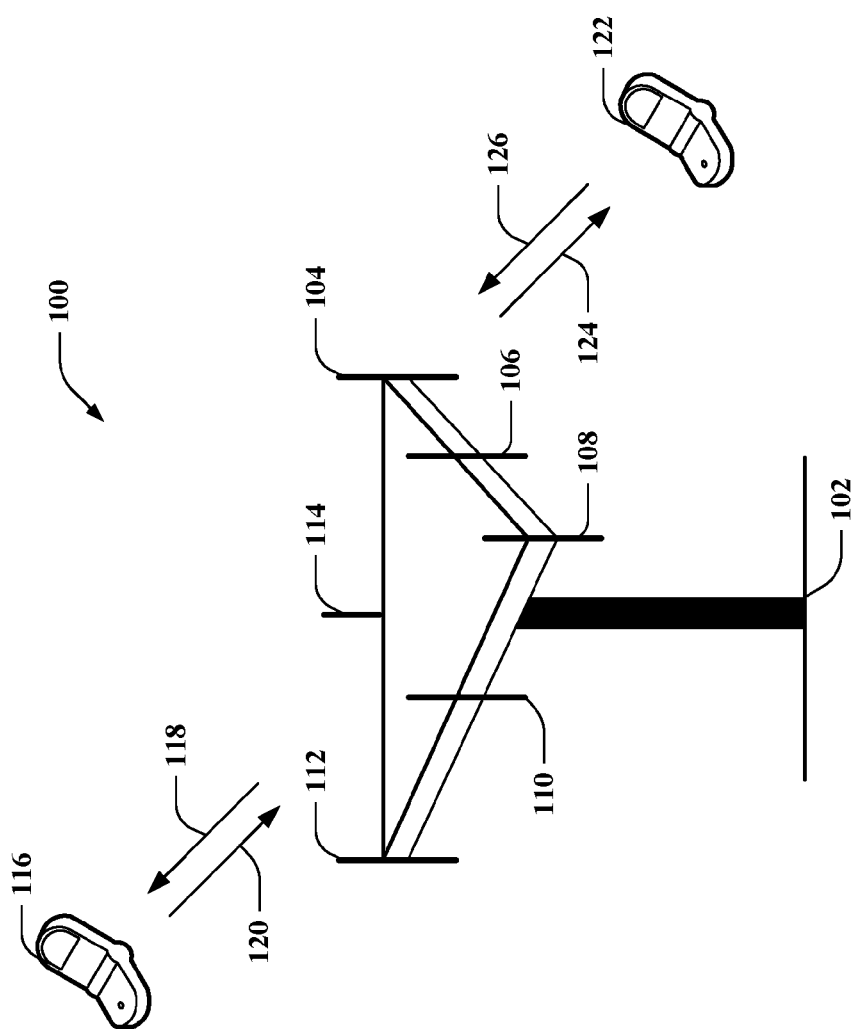
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, an Evolved Node B (eNode B, eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and Ultra Mobile Broadband (UMB) are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Various aspects or features described herein can be implemented as a method, apparatus, or article of manufacture using standard programming and/or engineering techniques.

The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 and mobile devices 116, 122 can be employed in a cooperative wireless communication environment such as for, instance, a coordinated multi-point (CoMP) environment (e.g., network multiple-input multiple-output (MIMO) environment, . . . ). For instance, base station 102 can be a macro cell base station, a pico cell base station, a femto cell base station, a micro cell base station, or the like. Moreover, disparate base station(s) (not shown) can be located nearby base station 102, and these neighbor base station(s) can be macro cell base station(s), pico cell base station(s), femto cell base station(s), micro cell base station(s), a combination thereof, etc.

According to various aspects, mobile devices 116, 122 can each communicate with any suitable number of base stations (e.g., base station 102, disparate base station(s), . . . ). For example, mobile devices 116, 122 can each utilize one or more techniques such as network multiple-input multiple-output (Network MIMO or N-MIMO), coordinated multi-point (CoMP), and/or other techniques, by which a single mobile device 116, 122 is enabled to communicate with a plurality of base stations (e.g., base station 102, disparate base station(s), . . . ) and/or sectors thereof. Additionally or alternatively, communication between base station 102 and a mobile device (e.g., one of mobile devices 116, 122, . . . ) can result in strong dominant interference to other nearby base stations and/or mobile devices. For example, if a mobile device is located at an edge of a coverage area corresponding to base station 102 that serves the mobile device, communication between the mobile device and its serving base station 102 can cause interference to one or more other base stations within range of the mobile device with which the mobile device is not communicating under various circumstances. This can occur, for example, in a system that includes femto cell base stations if a mobile device is located within the coverage area of a femto cell base station, which in turn is embedded into a coverage area of a macro cell base station.

In accordance with another aspect, base stations (e.g., base station 102, disparate base station(s), . . . ) in system 100 can coordinate pursuant to one or more cooperation strategies in order to increase data rates associated with communication with a given mobile device 116, 122 and/or to reduce interference caused to other base stations and/or mobile devices 116, 122 in system 100. In an example, respective base stations in system 100 can be operable to utilize one or more of a plurality of cooperation techniques for transmission to one or more mobile devices 116, 122, such as cooperative silence (CS), joint transmission (JT) via inter-eNodeB (inter-site) packet sharing, cooperative beamforming (CBF), and/or any other suitable cooperation technique(s) as generally known in the art. In another example, various operational aspects of system 100 such as respective cooperation techniques to be utilized for communication, base stations to be utilized for such cooperation techniques, and respective mobile devices 116, 122 to be served via cooperative communication, can be based at least in part on marginal utility calculations and/or any other suitable metric.

In a CoMP environment, a given base station (e.g., base station 102, disparate base station, . . . ) can be an anchor cell base station for a particular mobile device (e.g., one of mobile devices 116, 122, . . . ) at a particular time. An anchor cell base station can be responsible for scheduling the particular mobile device, exchanging control signaling with the particular mobile device, and so forth. Further, depending on the cooperation technique(s) employed, non-anchor cell base station(s) (e.g., base stations that lack responsibility for scheduling the particular mobile device, exchanging control signaling with the particular mobile device, . . . ) can transmit data to the particular mobile device, receive data from the particular mobile device, mitigate interference to the particular mobile device, and so forth. To effectuate the foregoing, non-anchor cell base station(s) can receive acknowledgments (ACKs) from the particular mobile device over the uplink and/or transmit acknowledgments to the particular mobile device over the downlink. While much of the discussion herein relates to acknowledgments, it is contemplated that the description can be extended to negative acknowledgments (NAKs).

System 100 can support identifying resources upon which an acknowledgment can be transmitted based upon a criterion recognizable by the anchor cell base station and non-anchor cell base station(s). Rather than being known by the anchor cell base station and unknown to other base stations (e.g., non-anchor cell base station(s), . . . ), the criterion can be more readily available to non-anchor cell base station(s), non-serving base station(s), and so forth. According to an example, a non-anchor cell base station can detect, demodulate, etc. an acknowledgment received over-the-air from a mobile device upon the identified resources. By way of further example, a non-anchor cell base station can transmit an acknowledgment over-the-air to a mobile device utilizing the identified resources. In contrast, conventional techniques oftentimes link resources utilized for communicating an acknowledgment to a grant sent by an anchor cell base station. Thus, since a non-anchor cell base station commonly lacks knowledge of a grant provided by the anchor cell base station, the non-anchor cell base station typically is unable to identify resources to monitor for discerning whether an acknowledgment is received from the mobile device or to send an acknowledgment to the mobile device.

Figure 2:
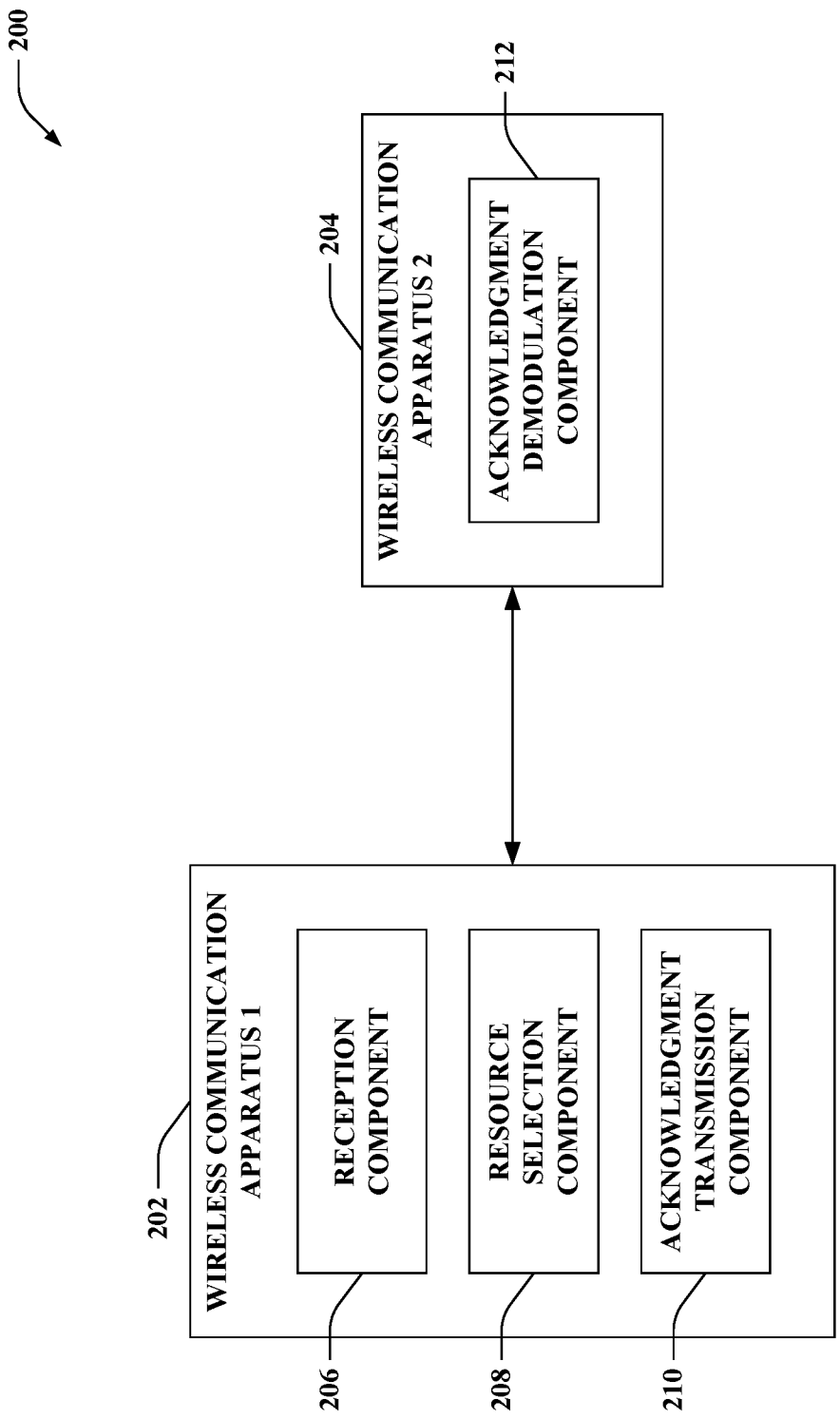
FIG. 2 is an illustration of an example system that employs resources for an acknowledgment that are identifiable by an anchor cell base station and a non-anchor cell base station in a wireless communication environment.

Now turning to FIG. 2, illustrated is a system 200 that employs resources for an acknowledgment that are identifiable by an anchor cell base station and a non-anchor cell base station in a wireless communication environment. System 200 includes a wireless communication apparatus 1 202 that sends an acknowledgment via a channel (e.g., uplink, downlink, . . . ) to a wireless communication apparatus 2 204. Although not shown, it is to be appreciated that wireless communication apparatus 1 202 and wireless communication apparatus 2 204 can be substantially similar; thus, it is contemplated that wireless communication apparatus 2 204 can transmit an acknowledgment to wireless communication apparatus 1 202. Wireless communication apparatus 1 202, for instance, can be a base station (e.g., base station 102 of FIG. 1, . . . ), a mobile device (e.g., mobile device 116 of FIG. 1, mobile device 122 of FIG. 1, . . . ), or the like. Moreover, wireless communication apparatus 2 204 can be, for example, a mobile device (e.g., mobile device 116 of FIG. 1, mobile device 122 of FIG. 1, . . . ), a base station (e.g., base station 102 of FIG. 1, . . . ), etc.

Wireless communication apparatus 1 202 can include a reception component 206, a resource selection component 208, and an acknowledgment transmission component 210. Reception component 206 can monitor a channel for a transmission (e.g., sent by wireless communication apparatus 2 204, disparate wireless communication apparatus(es) (not shown), . . . ). The transmission can include information, signals, data, instructions, commands, bits, symbols, or the like. Further, the transmission can comprise control information (e.g., grant, . . . ), traffic, and so forth. Moreover, reception component 206 can obtain, decode, etc. the transmission. Receiving the transmission with reception component 206 can cause wireless communication apparatus 1 202 to yield an acknowledgment. More particularly, resource selection component 208 can choose resources to utilize for sending the acknowledgment. Resource selection component 208 can select the resources for the acknowledgment based upon one or more criteria identifiable by non-anchor cell base station(s) such as, for instance, an identifier associated with a mobile device, resources employed for the transmission obtained via reception component 206, and so forth. The resources for the acknowledgment can map to the one or more criteria. Further, acknowledgment transmission component 210 can send the acknowledgment by employing the chosen resources.

Wireless communication apparatus 2 204 can further include an acknowledgment demodulation component 212 that can monitor a channel (e.g., uplink, downlink, . . . ) for an acknowledgment sent by wireless communication apparatus 1 202. Acknowledgment demodulation component 212 can identify resources that can be employed by wireless communication apparatus 1 202 for sending an acknowledgment, and observe the identified resources to recognize whether an acknowledgment is transmitted by wireless communication apparatus 1 202 upon such resources. Acknowledgment demodulation component 212 can detect the resources upon which the acknowledgment can be sent based upon one or more criteria (e.g., an identifier associated with a mobile device, resources employed for a transmission sent to wireless communication apparatus 1 202, . . . ).

The one or more criteria can be known by both wireless communication apparatus 1 202 and wireless communication apparatus 2 204. Further, a predefined relationship between the one or more criteria and acknowledgment resources can exist, and such relationship can be analyzed by both wireless communication apparatus 1 202 (e.g., resource selection component 208, . . . ) and wireless communication apparatus 2 204 (e.g., acknowledgment demodulation component 212, . . . ). Thus, regardless whether wireless communication apparatus 1 202 is a mobile device, an anchor cell base station, or a non-anchor cell base station and whether wireless communication apparatus 2 204 is an anchor cell base station, a non-anchor cell base station, or a mobile device, both wireless communication apparatuses 202-204 can have a common understanding of resources to be utilized for sending an acknowledgment from wireless communication apparatus 1 202 to wireless communication apparatus 2 204.

By way of example, the one or more criteria can include an identifier associated with a mobile device. Thus, an acknowledgment can be channelized based on the identifier associated with the mobile device such as, for instance, a media access control identifier (MACID) of the mobile device. By way of further illustration, the identifier can be a cell radio network temporary identifier (C-RNTI) or a short C-RNTI. The identifier can be negotiated between cells; thus, upon entering a system, the identifier can be assigned to the mobile device. Moreover, the identifier can be semi-statically assigned to the mobile device and can distinguish the mobile device from other mobile devices (e.g., on a physical/media access control (PHY/MAC) level, . . . ). According to an example, a short C-RNTI, C-RNTI, MACID, etc. can specify a predetermined set of resources where an acknowledgment can be transmitted. Further, this predetermined set of resources can be identified by resource selection component 208 of wireless communication apparatus 1 202 and acknowledgment demodulation component 212 of wireless communication apparatus 2 204 based upon a mapping between the predetermined set of resources and the short C-RNTI, C-RNTI, MACID, etc. corresponding to the mobile device.

Pursuant to another example, the one or more criteria can include physical resources upon which a transmission is sent to wireless communication apparatus 1 202 (e.g., as obtained by reception component 206, . . . ). Thus, a number of possible traffic resource configurations on which cooperative reception is possible can be limited, and resources to be utilized for an acknowledgment can be linked to these possible traffic resource configurations. For instance, acknowledgment resources can be associated with subbands (e.g., units of 1.08 MHz or 6 resource blocks (RBs), . . . ), in which case a non-anchor cell base station can receive an acknowledgment of a downlink transmission or send an acknowledgment of an uplink transmission for an assignment that spans a subset of subbands. Moreover, mapping acknowledgment resources to a limited set of traffic assignment configurations can provide a significant degree of scheduling flexibility, particularly when a total number of mobile devices that can warrant inter-site cooperation is relatively large and/or the set of mobile devices changes relatively fast. Further, physical resources utilized for the transmission can be relevant to non-anchor cell base station(s) (e.g., an anchor cell base station can indicate the physical resources to non-anchor cell base station(s) prior to the transmission, . . . ) when implementing a cooperation technique, since non-anchor cell base station(s) can be transmitting upon such resources (e.g., when leveraging joint transmission, . . . ), avoiding interference with such resources (e.g., when utilizing coordinated beamforming, . . . ), and so forth.

In contrast, conventional techniques oftentimes channelize an acknowledgment based on an actual assignment. For instance, an actual assignment is commonly conveyed from an anchor cell base station to a mobile device, and typically can be unknown or unavailable to non-anchor cell base station(s). Hence, non-anchor cell base station(s) can be unable to send acknowledgments or receive acknowledgments over-the-air under such conventional approaches. Rather, under common approaches, acknowledgments can be forwarded over a backhaul from an anchor cell base station to a non-anchor cell base station, which can cause latency in receipt of the acknowledgments by the non-anchor cell base station.

According to an example, system 200 can enable a base station other than a downlink serving base station to receive an acknowledgment as part of a soft handoff. Pursuant to another illustration, system 200 can support a downlink anchor cell base station for being responsible for scheduling and sending grants to a mobile device, while a separate, non-anchor cell base station can receive an acknowledgment (e.g., an uplink associated with the non-anchor cell base station can be stronger, . . . ). In accordance with yet another example, system 200 can enable data to be received on an uplink by a first base station (e.g., serving base station, . . . ), while a separate, second base station can sent a downlink acknowledgment (e.g., over a Physical Hybrid Automatic Repeat Request (HARQ) Indicator Channel (PHICH), . . . ). It is to be appreciated, however, that the claimed subject matter is not limited to the foregoing.

Figure 3:
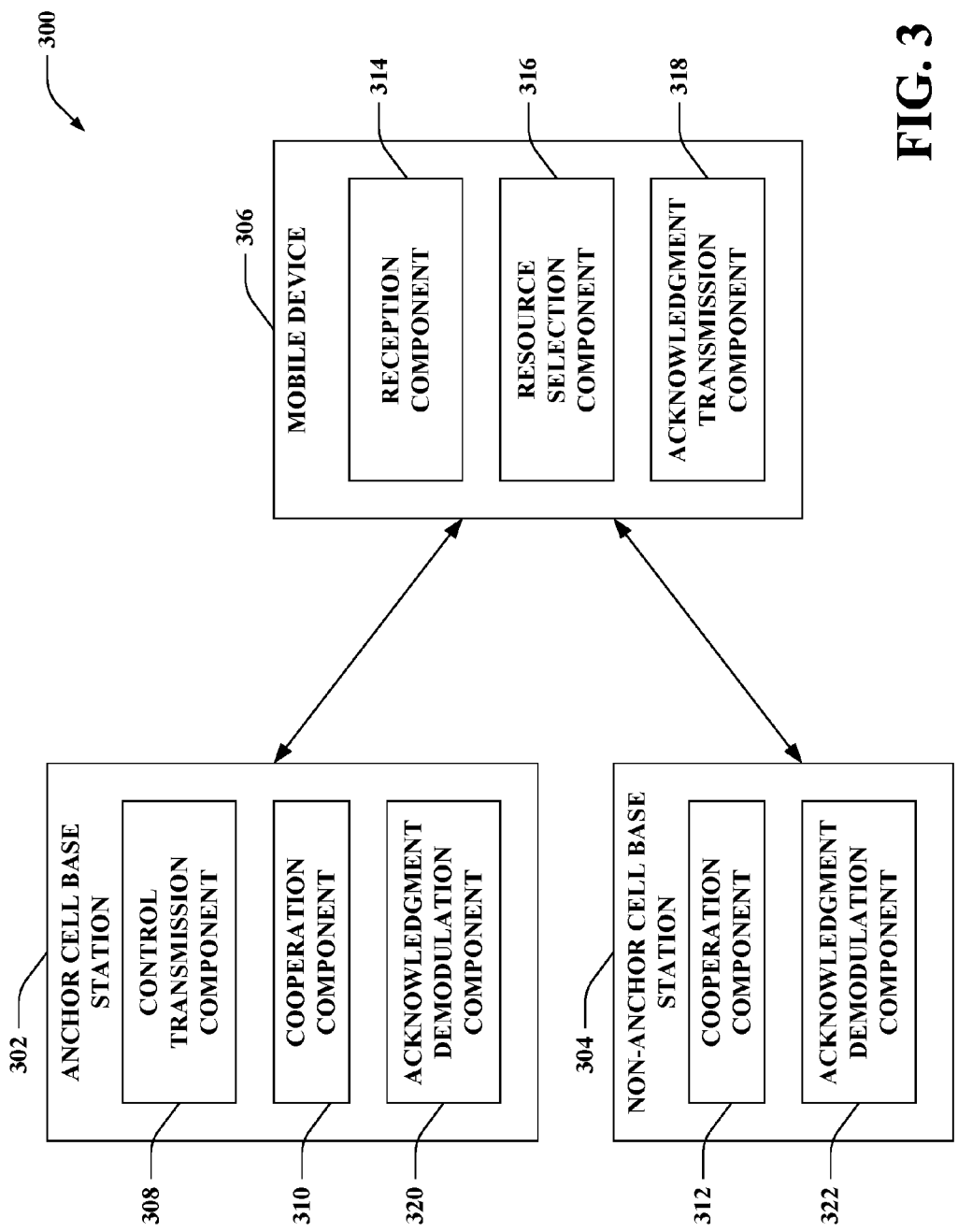
FIG. 3 is an illustration of an example system that transfers uplink acknowledgments in a wireless communication environment that leverages coordinated multi-point (CoMP).

With reference to FIG. 3, illustrated is a system 300 that transfers uplink acknowledgments in a wireless communication environment that leverages coordinated multi-point (CoMP). System 300 can include an anchor cell base station 302 and a non-anchor cell base station 304 that can be involved in serving a mobile device 306. Although not depicted, it is further contemplated that system 300 can include any number of additional base stations and/or mobile devices. Moreover, although not shown, it is to be appreciated that anchor cell base station 302 and non-anchor cell base station 304 can be substantially similar (e.g., non-anchor cell base station 304 can be an anchor cell base station for a disparate mobile device (not shown) or for mobile device 306 at a differing time, anchor cell base station 302 can be a non-anchor cell base station for a differing mobile device (not shown) or for mobile device 306 at a disparate time, . . . ).

Anchor cell base station 302 can be an attachment point for mobile device 306. Accordingly, anchor cell base station 302 can include a control transmission component 308 that can schedule an uplink transmission by mobile device 306 and/or a downlink transmission to mobile device 306. Further, control transmission component 308 can exchange control information with mobile device 306 by sending a grant to mobile device 306 for each uplink or downlink assignment. The grant can be transmitted by control transmission component 308 to mobile device 306 over a Physical Downlink Control Channel (PDCCH), for instance.

Control transmission component 308 can scramble a grant with a MACID or C-RNTI of mobile device 306 to which the grant is intended. For example, control transmission component 308 can yield a payload of a grant, encode the payload, infer a cyclic redundancy check (CRC) based upon the encoded payload, scramble the CRC with the MACID or C-RNTI of mobile device 306 that is targeted, and transmit such information packet with the scrambled CRC (e.g., via PDCCH, . . . ). Accordingly, mobile device 306 can demodulate a received information packet with a scrambled CRC to decipher whether it is directed to mobile device 306. By way of example, mobile device 306 can scramble the scrambled CRC of the received information packet with a MACID or C-RNTI allocated to mobile device 306 to detect whether CRC passes. If CRC passes, then mobile device 306 can recognize with high probability that the received grant (or other control information) is directed to mobile device 306, and accordingly, can proceed to interpret the payload. Alternatively, if CRC fails, then mobile device 306 can identify that the grant (or other control information) is not directed to mobile device 306 and interpretation of the payload can be skipped.

While anchor cell base station 302 can provide control information to mobile device 306, anchor cell base station 302 and non-anchor cell base station 304 (and/or any disparate base station(s)) can coordinate operation to yield a cooperation strategy for communication with mobile device 306 (and/or any disparate mobile device(s)). As such, anchor cell base station 302 can include a cooperation component 310 and non-anchor cell base station 304 can include a cooperation component 312. Cooperation components 310-312 can coordinate operation of anchor cell base station 302 and non-anchor cell base station 304 to effectuate one or more cooperation techniques. For example, a cooperation technique can be leveraged whereby mobile device 306 is cooperatively served by anchor cell base station 302 and non-anchor cell base station 304. Hence, virtual MIMO can be carried out as managed by cooperation components 310-312, effectively treating anchor cell base station 302 and non-anchor cell base station 304 as one base station. However, it is to be appreciated that the claimed subject matter is not so limited.

Cooperation strategies supported by cooperation components 310-312 can enable base stations 302-304 to pool together resources, antennas, and the like. Further, such cooperation strategies can allow for joint scheduling handled by base stations 302-304 included in a common cooperation strategy. Moreover, information can be shared between base stations 302-304 in the common cooperation strategy. For instance, the shared information can include channel information (e.g., for channel(s) between base station(s) and mobile device(s) in the common cooperation strategy, . . . ), packets (e.g., to be transmitted from one or more base stations 302-304 in the common cooperation strategy, . . . ), and so forth. Hence, base stations 302-304 can cooperate with each other; yet, base stations 302-304 need not cooperate with a base station included in a different cooperation strategy.

Cooperation components 310-312 can coordinate respective transmissions between base stations 302-304 and mobile device 306 (and/or any disparate base stations(s) and/or mobile device(s)) in system 300. In general, cooperation components 310-312 can be utilized by respective base stations 302-304 to compute and/or make scheduling decisions related to node clustering, scheduling, forms of cooperation transmission to be utilized, and so on. To these ends, cooperation components 310-312 can schedule respective nodes to be utilized for communication with mobile device 306, determine a form of cooperation to implement for communication with mobile device 306, and so forth.

In accordance with various aspects, a cooperation strategy can be selected by cooperation components 310-312 based on factors such as mobile device mobility, carrier to interference (C/I) levels associated with mobile device 306, capabilities of backhaul links between base stations 302-304 (and/or any disparate base station(s)), or the like. By way of example, cooperation components 310-312 can select cooperative silence and/or another similar simple form of cooperation in case of high mobility of mobile devices and/or rapidly changing channel conditions associated with given mobile device 306. Additionally or alternatively, if mobility of given mobile device 306 is determined to be low, or a high degree of antenna correlation is present with respect to mobile device 306, more advanced cooperation techniques such as joint transmission via inter-site packet sharing (e.g., in the case of relatively slow backhaul link between base stations 302-304, . . . ) or cooperative beamforming (e.g., in the case of relatively fast backhaul link between base stations 302-304, . . . ) can be selected.

In accordance with other aspects, a projected rate associated with respective mobile devices (e.g., mobile device 306, disparate mobile device(s), . . . ) can be utilized along with factors such as backhaul bandwidth, latency constraints, or the like, to select between respective cooperation techniques. For example, coordination component 310-312 can rule out a joint transmission technique using backhaul bandwidth and latency uncertainty based on associated a priori and/or long-term backhaul link classifications. In another example, channel state information at a transmitter (CSIT) delivery delay and accuracy, as well as scheduling delay and/or other suitable factors, can be factored in projected rate calculation.

When effectuating cooperation techniques within system 300 in connection with downlink transmission to mobile device 306, it can be beneficial for anchor cell base station 302 and non-anchor cell base station 304 to be able to monitor an uplink for an acknowledgment sent by mobile device 306. Accordingly, mobile device 306 can include a reception component 314 (e.g., substantially similar to reception component 206 of FIG. 2, . . . ), a resource selection component 316 (e.g., substantially similar to resource selection component 208 of FIG. 2, . . . ), and an acknowledgment transmission component 318 (e.g., substantially similar to acknowledgment transmission component 210 of FIG. 2, . . . ). Reception component 314 can monitor a downlink for a transmission. For example, the transmission can be from one base station (e.g., anchor cell base station 302, . . . ) when a cooperation technique such as coordinated beamforming is leveraged by cooperation components 310-312. By way of another example, the transmission can be from a plurality of base stations (e.g., anchor cell base station 302 and non-anchor cell base station 304, . . . ) when a cooperation technique such as joint transmission is implemented by cooperation components 310-312. Upon receiving the downlink transmission, resource selection component 316 can select resources to be employed for an acknowledgment to be sent over the uplink based upon one or more criteria such as, for instance, an identifier associated with mobile device 306 (e.g., MACID, C-RNTI, short C-RNTI, . . . ), resources employed for the transmission obtained via reception component 314, and so forth. Further, acknowledgment transmission component 318 can send the acknowledgment over the uplink by employing the chosen resources.

Anchor cell base station 302 can further include an acknowledgment demodulation component 320, and non-anchor cell base station 304 can further include an acknowledgment demodulation component 322. Acknowledgment demodulation components 320-322 can each be substantially similar to acknowledgment demodulation component 212 of FIG. 2. Thus, acknowledgment demodulation components 320-322 can each recognize resources that can be employed by mobile device 306 in connection with sending an acknowledgment over the uplink (e.g., based upon the one or more criteria, . . . ), and monitor such resources to decipher whether an acknowledgment is actually transmitted over the uplink by mobile device 306.

For instance, non-anchor cell base station 304 can be a strongest uplink cell that can monitor the uplink for an acknowledgment from mobile device 306 even though non-anchor cell base station 304 may not be a downlink anchor cell base station and/or a downlink serving cell base station for mobile device 306. Thus, the uplink acknowledgment can be channelized based on the C-RNTI, short C-RNTI, MACID, or any other identifier corresponding to mobile device 306. Additionally or alternatively, the uplink acknowledgment can be channelized based on physical resources utilized for the downlink transmission sent to mobile device 306. Accordingly, non-anchor cell base station 304 can leverage acknowledgment demodulation component 322 to detect whether an acknowledgment is sent over the uplink by mobile device 306 without needing to be aware of an assignment (e.g., grant, . . . ) sent by anchor cell base station 302 (e.g., control transmission component 308, . . . ). By way of example, reception of an acknowledgment as discerned by acknowledgment demodulation component 322 can enable non-anchor cell base station 304 to recognize that further downlink transmission may not be needed in case of leveraging joint transmission or forming a null towards mobile device 306 may not be needed in case of implementing coordinated beamforming; however, the claimed subject matter is not so limited.

Figure 4:
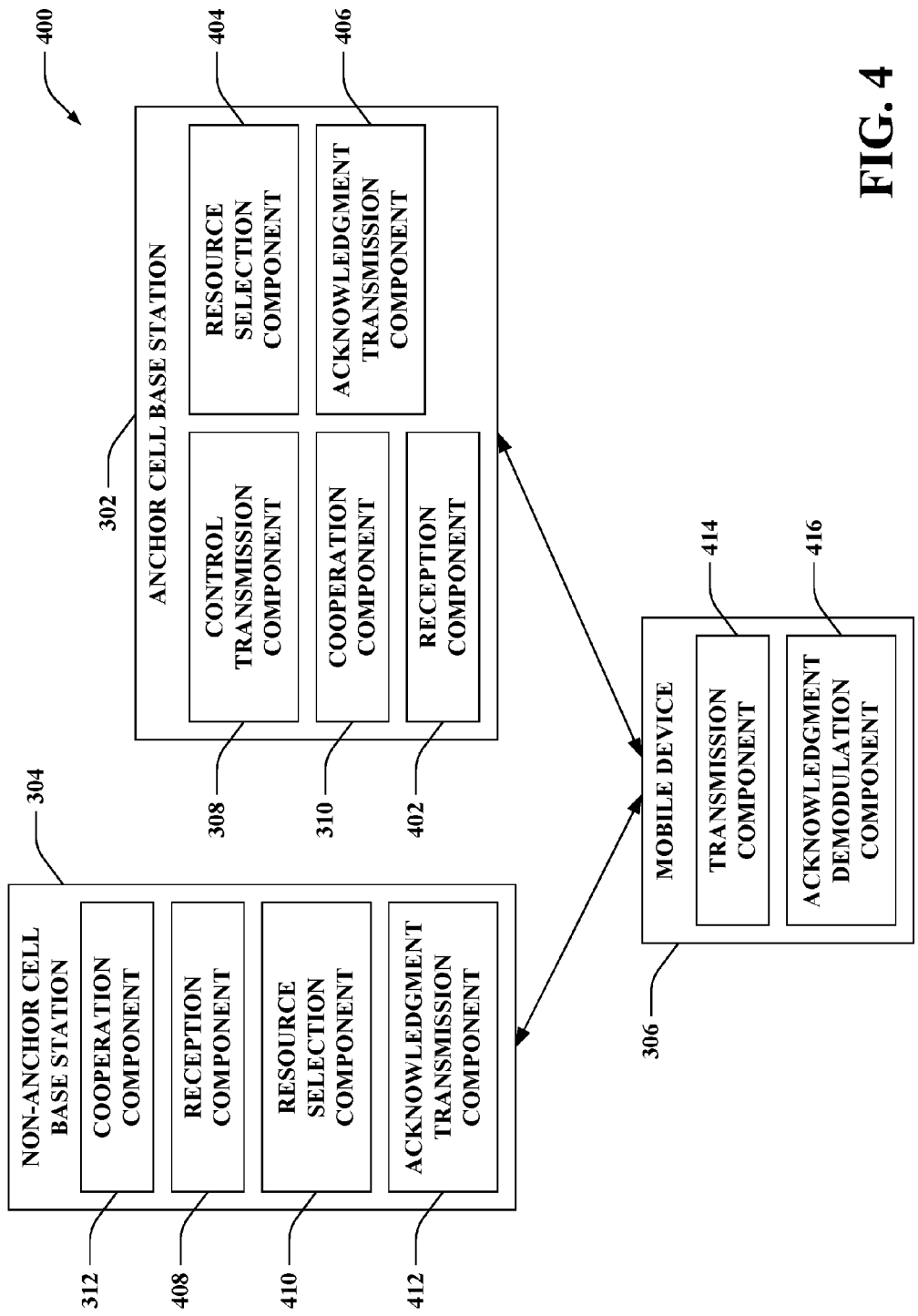
FIG. 4 is an illustration of an example system that exchanges downlink acknowledgments in a wireless communication environment that leverages coordinated multi-point (CoMP).

Turning to FIG. 4, illustrated is a system 400 that exchanges downlink acknowledgments in a wireless communication environment that leverages coordinated multi-point (CoMP). System 400 includes anchor cell base station 302, non-anchor cell base station 304, and mobile device 306; yet, it is to be appreciated that the claimed subject matter is not so limited. As described herein, anchor cell base station 302 can include control transmission component 308, which can schedule an uplink transmission by mobile device 306 and/or a downlink transmission to mobile device 306. Further, anchor cell base station 302 and non-anchor cell base station 304 can each include respective cooperation components 310-312 as noted herein.

Moreover, anchor cell base station 302 can include a reception component 402, a resource selection component 404, and an acknowledgment transmission component 406. Similarly, non-anchor cell base station 304 can include a reception component 408, a resource selection component 410, and an acknowledgment transmission component 412. It is contemplated that reception components 402 and 408 can be substantially similar to reception component 206 of FIG. 2, resource selection components 404 and 410 can be substantially similar to resource selection component 208 of FIG. 2, and acknowledgment transmission components 406 and 412 can be substantially similar to acknowledgment transmission component 210 of FIG. 2.

Mobile device 306 can include a transmission component 414 that can yield an uplink transmission in response to a grant provided by control transmission component 308 of anchor cell base station 302. Moreover, mobile device 306 can include an acknowledgment demodulation component 416, which can be substantially similar to acknowledgment demodulation component 212 of FIG. 2.

According to an example, transmission component 414 can send an uplink transmission (e.g., over an Uplink Shared Channel (UL-SCH), . . . ) as scheduled by anchor cell base station 302 (e.g., signaled via control information provided by control transmission component 308, . . . ). A base station (e.g., anchor cell base station 302, non-anchor cell base station 304, . . . ) that receives the uplink packet (e.g., with a respective reception component 402, 408, . . . ) from mobile device 306 can send an acknowledgment over the downlink in response (e.g., upon resources identified by a respective resource selection component 404, 410, . . . ). For instance, the acknowledgment can be sent over a Physical Hybrid Automatic Repeat Request (HARQ) Indicator Channel (PHICH). Further, the PHICH can be sent on a set of resource blocks (RBs) that are channelized based on the C-RNTI, short C-RNTI, MACID, or any other identifier corresponding to mobile device 306. Additionally or alternatively, the downlink acknowledgment can be channelized based on physical resources utilized for the uplink transmission received from mobile device 306. Further, it is contemplated that a dedicated reference signal can be used for the acknowledgment so mobile device 306 need not be aware of the base station sending the acknowledgment.

Figure 5:
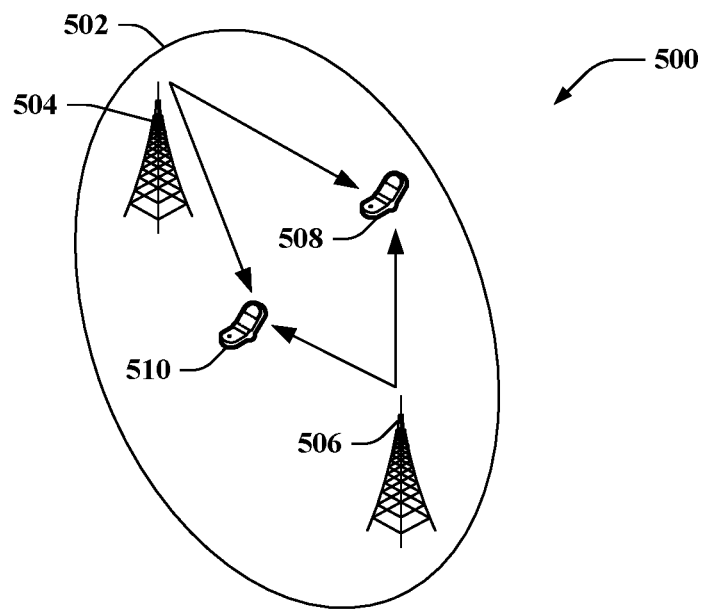
FIG. 5 is an illustration of an example system that employs inter-site packet sharing (ISPS) (e.g., coherent ISPS, . . . ) within a cluster in a wireless communication environment.
Figure 6:
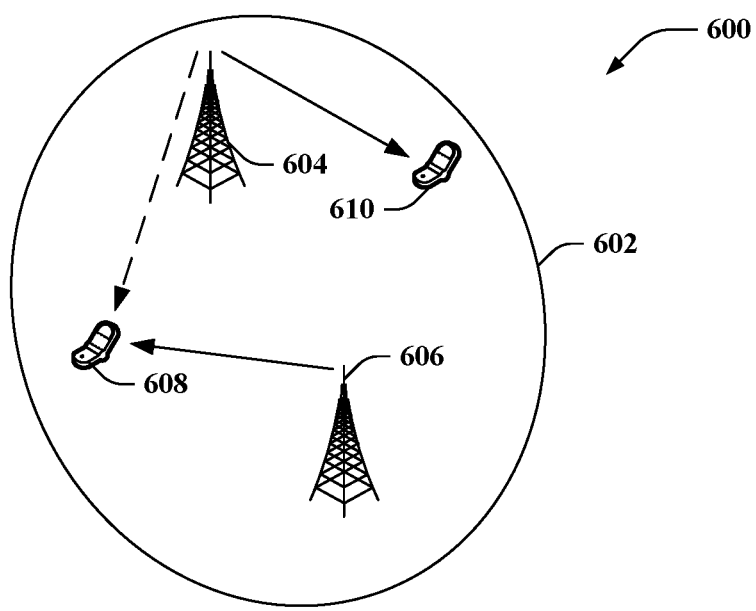
FIG. 6 is an illustration of an example system that implements cooperative beamforming within a cluster in a wireless communication environment.
Figure 7:
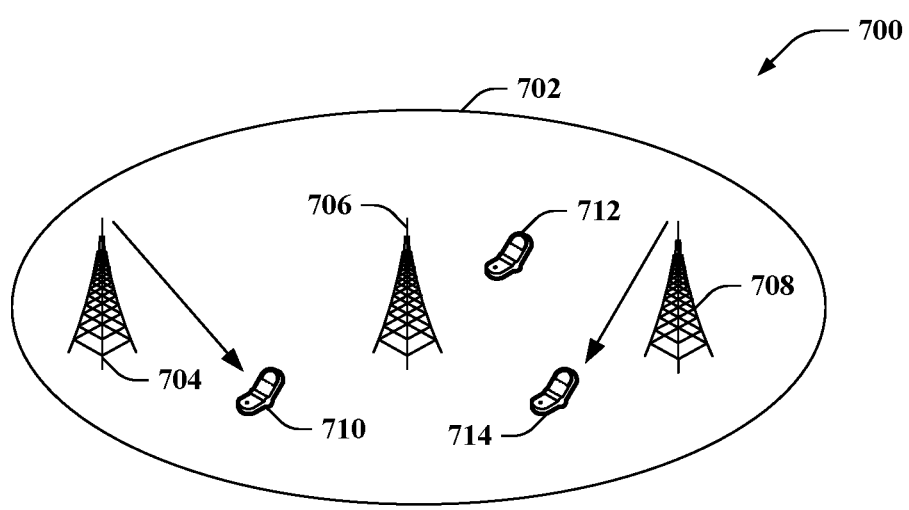
FIG. 7 is an illustration of an example system that effectuates cooperative silence (CS) within a cluster in a wireless communication environment.

With reference to FIGS. 5-7, illustrated are various example cooperation techniques that can be implemented within a cluster in a wireless communication environment. Each cluster can include a set of base stations and a set of mobile devices. Base station(s) and mobile device(s) included in each cluster can be statically or dynamically defined. For instance, at a given point in time, a cluster can include anchor cell base station 302, non-anchor cell base station 304, and mobile device 306 described herein. Moreover, each of the example cooperation techniques can be managed, scheduled, coordinated, etc. by respective cooperation components (e.g., cooperation components 310 and 312, . . . ) of base stations included in each cluster. Depicted are examples of inter-site packet sharing, cooperative beamforming, and cooperative silence; it is to be appreciated, however, that the claimed subject matter is not limited to the examples shown in FIGS. 5-7 as these techniques are shown for illustration purposes.

Turning to FIG. 5, illustrated is an example system 500 that employs inter-site packet sharing (ISPS) (e.g., coherent ISPS, . . . ) within a cluster 502 in a wireless communication environment. Cluster 502 includes base stations 504 and 506 and mobile devices 508 and 510. Inter-site packet sharing can also be referred to as joint processing or joint transmission. When leveraging inter-site packet sharing, each base station 504-506 within cluster 502 can be involved in data transmission to each mobile device 508-510 included in cluster 502.

Inter-site packet sharing can be most efficient with a limited number of transmit antennas per base station 504-506 (e.g., limited number of transmit antennas per node, . . . ). For example, base stations 504-506 can each include one transmit antenna. Thus, the two base stations 504-506 within cluster 502 can effectively be utilized as one base station with two antennas when serving mobile devices 508-510; however, the claimed subject matter is not so limited.

Inter-site packet sharing can leverage a high bandwidth backhaul between base stations 504-506. Moreover, fast acknowledgment and negative acknowledgement ((N)ACK) distribution across cooperating base stations 504-506 can be used in system 500. Further, inter-site packet sharing can be sensitive to channel state information (CSI). Inter-site packet sharing can be used by a collection of base stations 504-506 and mobile devices 508-510 that yield a substantial performance benefit.

Now referring to FIG. 6, illustrated is an example system 600 that implements cooperative beamforming within a cluster 602 in a wireless communication environment. Cluster 602 includes base stations 604 and 606 and mobile devices 608 and 610. Cooperative beamforming can also be referred to as coordinated beamforming or distributed beamforming (DBF). To effectuate cooperative beamforming, base stations 604-606 can each have multiple transmit antennas; yet, the claimed subject matter is not so limited.

As depicted, base station 604 can serve mobile device 610 and base station 606 can serve mobile device 608 within cluster 602. When base station 604 sends a transmission to mobile device 610, base station 604 can yield a beam that mitigates interference to mobile device 608 (e.g., beams to mobile device 610 with transmit nulling to mobile device 608, . . . ). Thus, each base station 604-606 can coordinate scheduling, control beamforming, etc. so as to lower interference to mobile device(s) within cluster 602 not being served thereby. Cooperative beamforming can leverage medium backhaul (control) requirements and can be less sensitive to channel state information (CSI) as compared to inter-site packet sharing. Hence, cooperative beamforming can be considered as an alternative to inter-site packet sharing based on a performance differential; however, the claimed subject matter is not so limited.

Turning to FIG. 7, illustrated is an example system 700 that effectuates cooperative silence (CS) within a cluster 702 in a wireless communication environment. Cooperative silence can also be referred to as coordinated silence. Cluster 702 includes base stations 704, 706, and 708 and mobile devices 710, 712, and 714. As shown, base station 704 can serve mobile device 710, and base station 708 can serve mobile device 714. Further, base station 706 can be silent for the benefit of mobile devices 710 and 714. Thus, cooperative silence can include a node (e.g., base station 706, . . . ) abstaining from transmission when it is beneficial for an entire neighborhood (e.g., to remove interference, . . . ).

Moreover, cooperative silence can leverage minimum backhaul and channel state information (CSI) requirements. It is to be appreciated, however, that the claimed subject matter is not limited to the foregoing.

Figure 8:
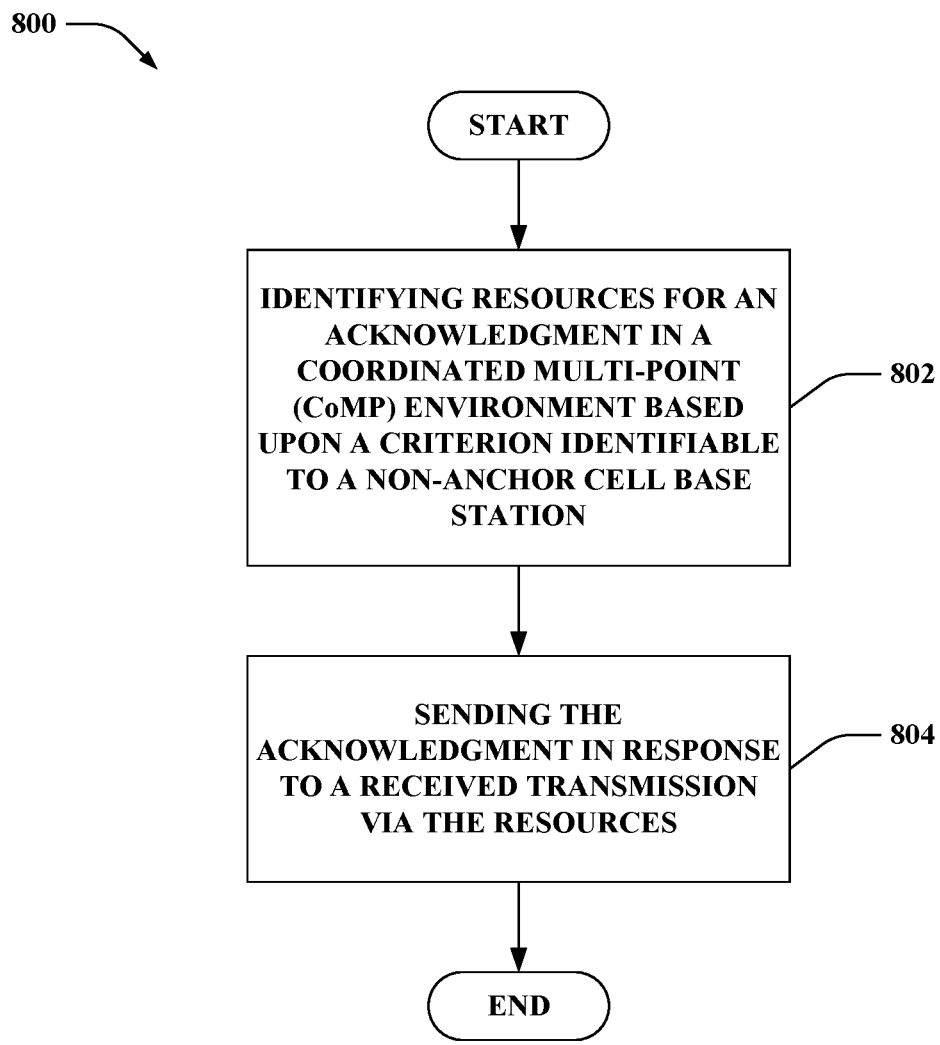
FIG. 8 is an illustration of an example methodology that facilitates yielding an acknowledgment in a wireless communication environment.
Figure 9:
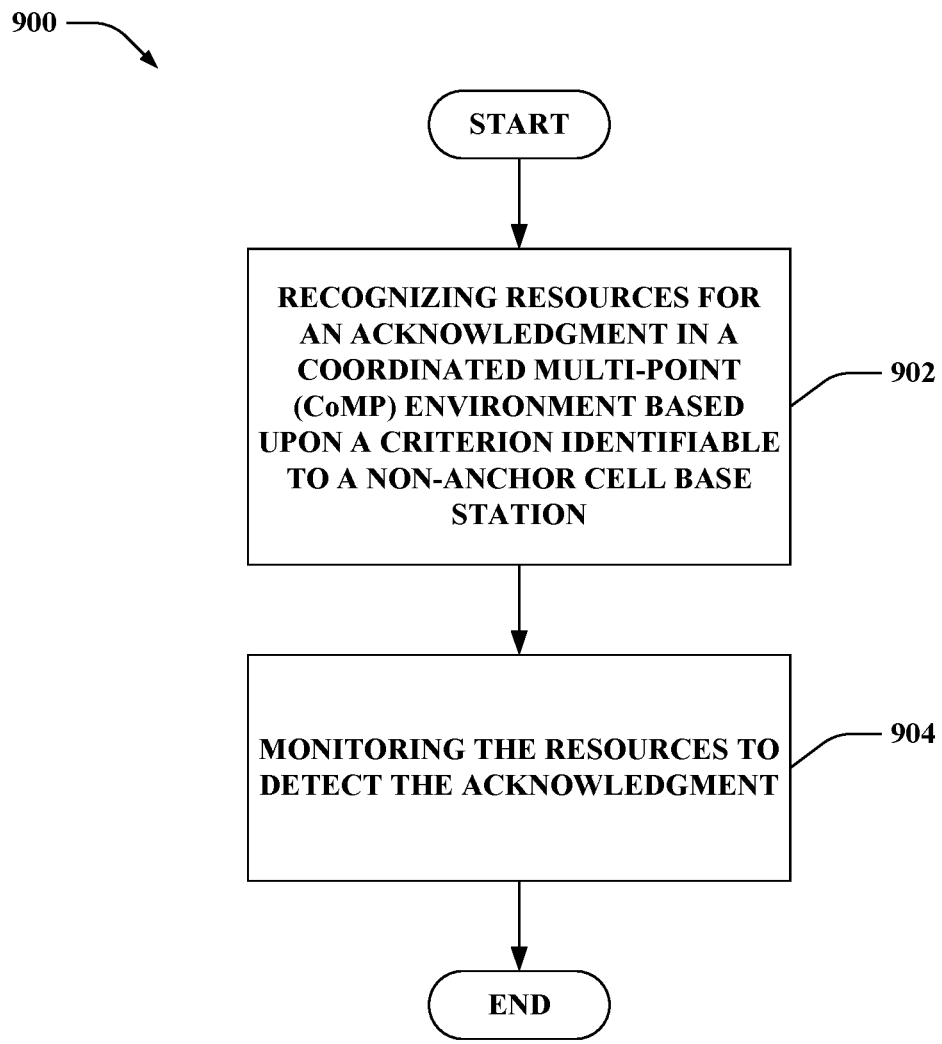
FIG. 9 is an illustration of an example methodology that facilitates obtaining an acknowledgment in a wireless communication environment.

Referring to FIGS. 8-9, methodologies relating to exchanging an acknowledgment in a coordinated multi-point (CoMP) wireless communication environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 8, illustrated is a methodology 800 that facilitates yielding an acknowledgment in a wireless communication environment. At 802, resources for an acknowledgment in a coordinated multi-point (CoMP) environment can be identified based upon a criterion identifiable to a non-anchor cell base station. For instance, one or more cooperation technique such as joint transmission via inter-site packet sharing, cooperative beamforming, cooperative silence, or the like can be implemented in the CoMP environment. Moreover, an anchor cell base station can be responsible for scheduling a mobile device, exchanging control signaling with the mobile device, and so forth in the CoMP environment. Further, the non-anchor cell base station can send a transmission (e.g., traffic, . . . ) to the mobile device, receive a transmission (e.g., traffic, . . . ) from the mobile device, avoid interference to the mobile device, or the like when implementing cooperation technique(s) in the CoMP environment.

According to an example, the criterion can be an identifier associated with a mobile device. For instance, the identifier can be a media access control identifier (MACID) of the mobile device, a cell radio network temporary identifier (C-RNTI) of the mobile device, a short C-RNTI of the mobile device, or the like. Further, the identifier can be identifiable to the non-anchor cell base station (as well as an anchor cell base station) by being negotiated between a plurality of base stations (e.g., including the non-anchor cell base station, the anchor cell base station, . . . ) and assigned to the mobile device upon the mobile device entering a wireless communication system. Moreover, the identifier can be semi-statically assigned to the mobile device and can distinguish the mobile device from disparate mobile devices. The identifier can map to a predetermined set of resources which can be utilized for transmitting the acknowledgment.

By way of another example, the criterion can be physical resources corresponding to a received transmission (e.g., the physical resources upon which a transmission is received, . . . ), where the acknowledgment is responsive to the transmission. The physical resources upon which the transmission is received can be scheduled by an anchor cell base station. Moreover, the physical resources upon which the transmission is received can be identifiable to the non-anchor cell base station since the anchor cell base station can indicate the physical resources as scheduled to the non-anchor cell base station prior to the transmission when implementing a cooperation technique. For instance, possible traffic resource configurations can each respectively be linked to corresponding resources for acknowledgments.

Thus, a particular traffic resource configuration associated with the transmission that is received can be recognized, and the resources for the acknowledgment can be identified based upon the link. By way of further illustration, each subband (e.g., 6 resource blocks, 1.08 MHz, . . . ) can be associated with corresponding resources for an acknowledgment. Pursuant to this illustration, a given subband employed for a received transmission can be recognized, and resources for an acknowledgment that map to the given subband can be identified.

At 804, the acknowledgment can be sent in response to a received transmission via the resources. For example, the received transmission can be a downlink transmission and the acknowledgment can be sent over an uplink. By way of another example, the received transmission can be an uplink transmission and the acknowledgment can be sent over a downlink (e.g., via a Physical Hybrid Automatic Repeat Request (HARQ) Indicator Channel (PHICH), . . . ). Following this example, a dedicated reference signal can be utilized for the acknowledgment sent over the downlink. Moreover, the acknowledgment sent over the downlink can be sent by an anchor cell base station, the non-anchor cell base station, or the like.

With reference to FIG. 9, illustrated is a methodology 900 that facilitates obtaining an acknowledgment in a wireless communication environment. At 902, resources for an acknowledgment in a coordinated multi-point (CoMP) environment can be recognized based upon a criterion identifiable to a non-anchor cell base station. The criterion, for example, can be an identifier (e.g., MACID, C-RNTI, short C-RNTI, . . . ) corresponding to a mobile device, physical resources upon which a transmission is sent (e.g., where the acknowledgment is responsive to the transmission, . . . ), or the like. At 904, the resources can be monitored to detect the acknowledgment. The resources can be monitored by the non-anchor cell base station, an anchor cell base station, a mobile device, and so forth. Moreover, the acknowledgment can be received, decoded, demodulated, etc.

By way of example, an anchor cell base station can send a transmission to a mobile device. Further, resources for the acknowledgment responsive to the transmission can be recognized based upon the criterion (e.g., identifier corresponding to the mobile device, physical resources utilized for the transmission as identified by the anchor cell base station, . . . ) by the non-anchor cell base station. Moreover, the resources can be monitored by the non-anchor cell base station to detect the acknowledgment. Thus, for instance, the non-anchor cell base station can monitor the uplink for the acknowledgment without being responsible for scheduling the mobile device, exchanging control signaling with the mobile device, and so forth in the CoMP environment. It is to be appreciated, however, that the claimed subject matter is not limited to the foregoing example.

It will be appreciated that, in accordance with one or more aspects described herein, inferences can be made regarding selecting resources for sending or receiving acknowledgments in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining resources for an acknowledgment. By way of further illustration, an inference can be made related to identifying cooperation technique(s) to employ in a CoMP environment. It will be appreciated that the foregoing examples are illustrative in nature and are not intended to limit the number of inferences that can be made or the manner in which such inferences are made in conjunction with the various embodiments and/or methods described herein.

Figure 10:
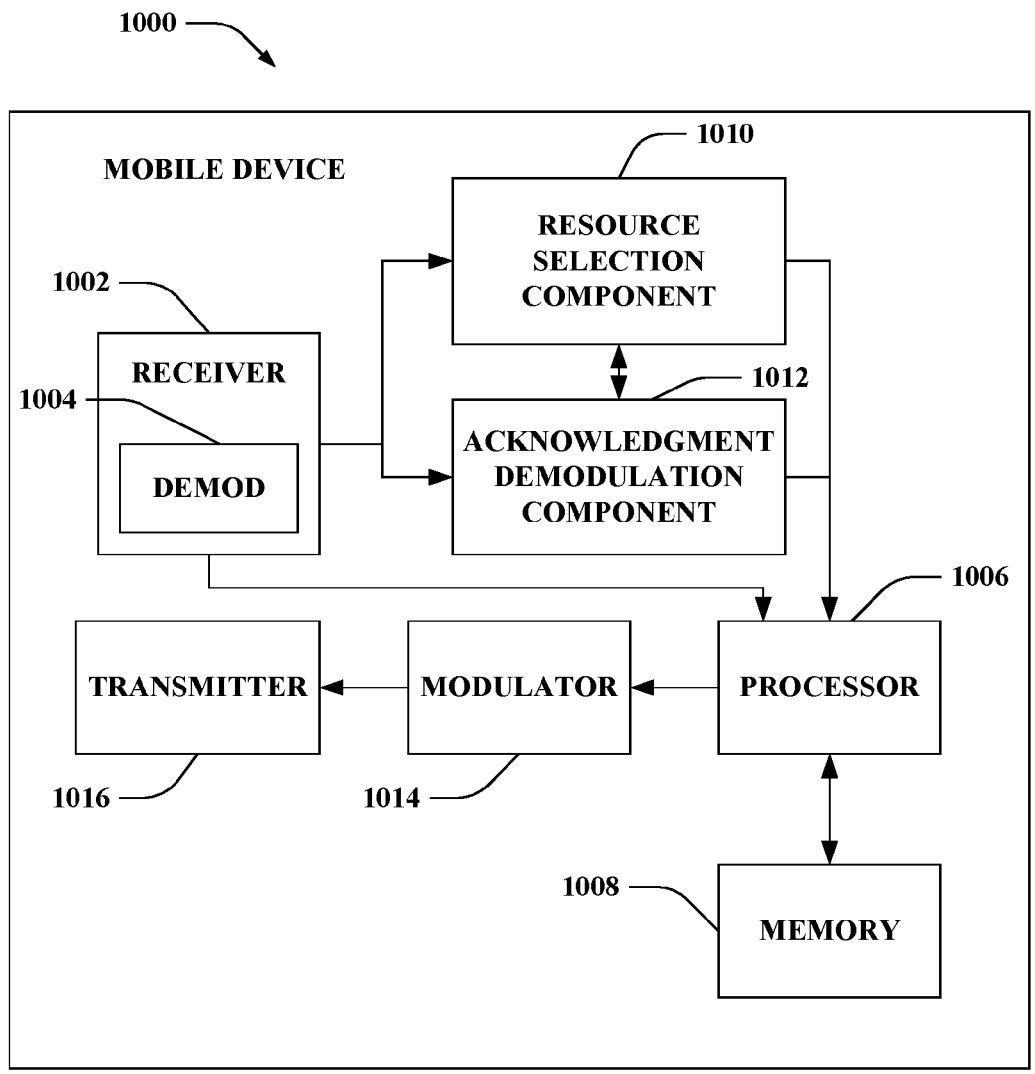
FIG. 10 is an illustration of an example mobile device that sends and/or receives acknowledgments in a CoMP wireless communication system.

FIG. 10 is an illustration of a mobile device 1000 that sends and/or receives acknowledgments in a CoMP wireless communication system. Mobile device 1000 comprises a receiver 1002 (e.g., reception component 206 of FIG. 2, . . . ) that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1016 (e.g., acknowledgment transmission component 210 of FIG. 2, transmission component 414 of FIG. 4, . . . ), a processor that controls one or more components of mobile device 1000, and/or a processor that both analyzes information received by receiver 1002, generates information for transmission by transmitter 1016, and controls one or more components of mobile device 1000.

Mobile device 1000 can additionally comprise memory 1008 that is operatively coupled to processor 1006 and that can store data to be transmitted, received data, and any other suitable information related to performing the various actions and functions set forth herein. Memory 1008, for instance, can store protocols and/or algorithms associated with identifying resources for an acknowledgment based upon a criterion, sending an acknowledgment upon such resources, monitoring such resources to detect an acknowledgment, and so forth.

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Processor 1006 can be operatively coupled to a resource selection component 1010 and/or an acknowledgment demodulation component 1012. Resource selection component 1010 can be substantially similar to resource selection component 208 of FIG. 2 and/or acknowledgment demodulation component 1012 can be substantially similar to acknowledgment demodulation component 212 of FIG. 2. According to an example, mobile device 1000 can receive a transmission with receiver 1002 (e.g., reception component 206 of FIG. 2, . . . ), recognize resources to employ for an acknowledgment responsive to the transmission based upon one or more criteria with resource selection component 1010, and send the acknowledgment utilizing the resources as recognized via transmitter 1016 (e.g., acknowledgment transmission component 210 of FIG. 2, . . . ). By way of another example, acknowledgment demodulation component 1012 can identify resources that can be employed for sending an acknowledgment, and observe the identified resources to recognize whether an acknowledgment is sent upon such identified resources. Mobile device 1000 still further comprises a modulator 1014 and a transmitter 1016 that transmits data, signals, etc. to a base station. Although depicted as being separate from the processor 1006, it is to be appreciated that resource selection component 1010, acknowledgment demodulation component 1012 and/or modulator 1014 can be part of processor 1006 or a number of processors (not shown).

Figure 11:
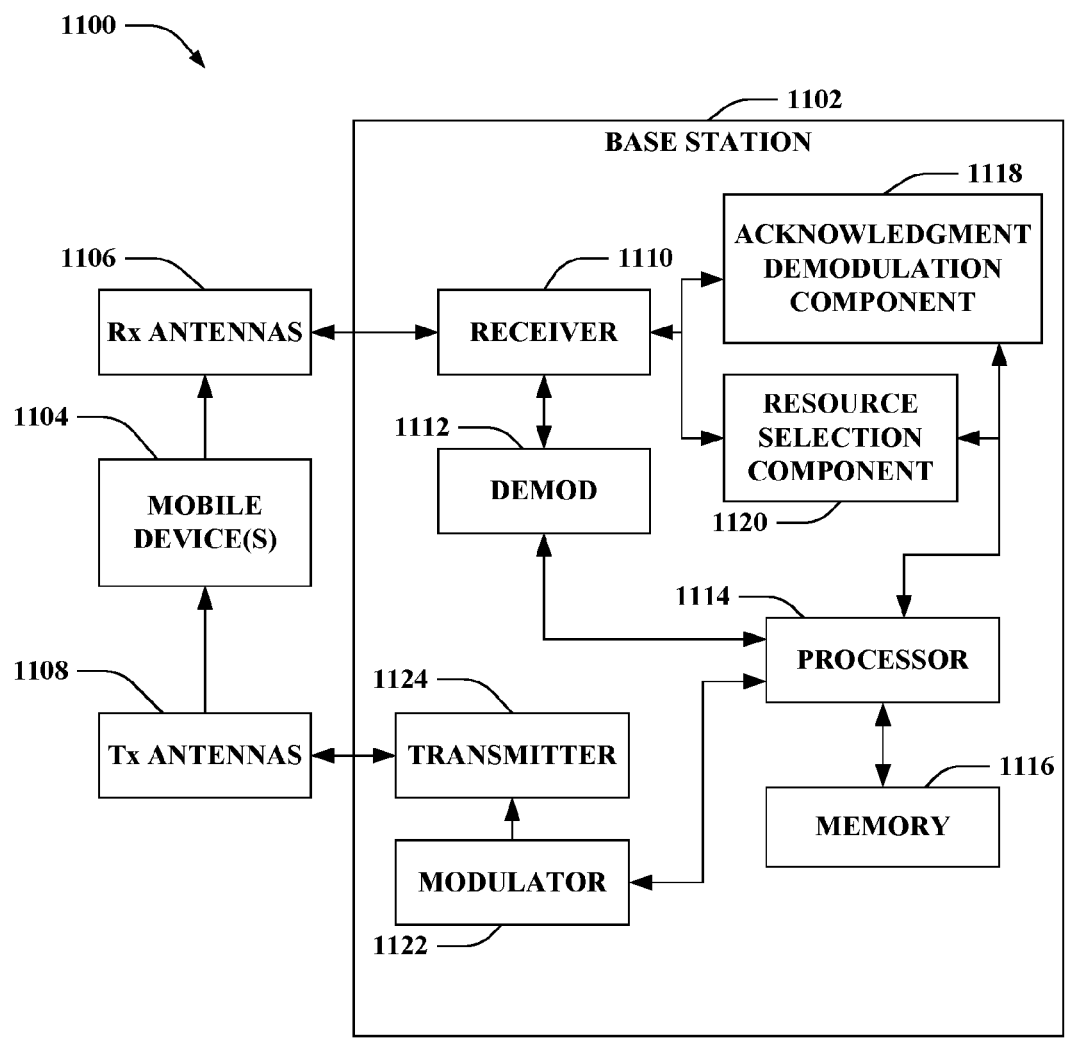
FIG. 11 is an illustration of an example system that sends and/or receives acknowledgments in a CoMP wireless communication environment.

FIG. 11 is an illustration of a system 1100 that sends and/or receives acknowledgments in a CoMP wireless communication environment. System 1100 comprises a base station 1102 (e.g., access point, . . . ) with a receiver 1110 (e.g., reception component 206 of FIG. 2, . . . ) that receives signal(s) from one or more mobile devices 1104 through a plurality of receive antennas 1106, and a transmitter 1124 (e.g., acknowledgment transmission component 210 of FIG. 2, . . . ) that transmits to the one or more mobile devices 1104 through a transmit antenna 1108. Moreover, base station 1102 can receive signal(s) with receiver 1110 from one or more disparate base stations through the plurality of receive antennas 1106 and/or transmit to one or more disparate base stations with transmitter 1124 through the transmit antenna 1108. According to another illustration, base station 1102 can receive signal(s) from (e.g., with receiver 1110, . . . ) and/or transmit signal(s) to (e.g., with transmitter 1124, . . . ) one or more disparate base stations via a backhaul. Receiver 1110 can receive information from receive antennas 1106 and is operatively associated with a demodulator 1112 that demodulates received information. Demodulated symbols are analyzed by a processor 1114 that can be similar to the processor described above with regard to FIG. 10, and which is coupled to a memory 1116 that stores data to be transmitted to or received from mobile device(s) 1104 and/or disparate base station(s) and/or any other suitable information related to performing the various actions and functions set forth herein. Processor 1114 is further coupled to an acknowledgment demodulation component 1118 and/or a resource selection component 1120. Resource selection component 1120 can be substantially similar to resource selection component 208 of FIG. 2 and/or acknowledgment demodulation component 1118 can be substantially similar to acknowledgment demodulation component 212 of FIG. 2. According to an example, base station 1102 can receive a transmission with receiver 1110 (e.g., reception component 206 of FIG. 2, . . . ), recognize resources to employ for an acknowledgment responsive to the transmission based upon one or more criteria with resource selection component 1120, and send the acknowledgment utilizing the resources as recognized via transmitter 1124 (e.g., acknowledgment transmission component 210 of FIG. 2, . . . ). By way of another example, acknowledgment demodulation component 1118 can identify resources that can be employed for sending an acknowledgment, and observe the identified resources to recognize whether an acknowledgment is sent upon such identified resources. Moreover, although not shown, it is to be appreciated that base station 1102 can further include a control transmission component (e.g., substantially similar to control transmission component 308, . . . ) and/or a cooperation component (e.g., substantially similar to cooperation component 310 or 312, . . . ). Base station 1102 can further include a modulator 1122. Modulator 1122 can multiplex a frame for transmission by a transmitter 1124 through antennas 1108 to mobile device(s) 1104 in accordance with the aforementioned description. Although depicted as being separate from the processor 1114, it is to be appreciated that acknowledgment demodulation component 1118, resource selection component 1120, and/or modulator 1122 can be part of processor 1114 or a number of processors (not shown).

Figure 12:
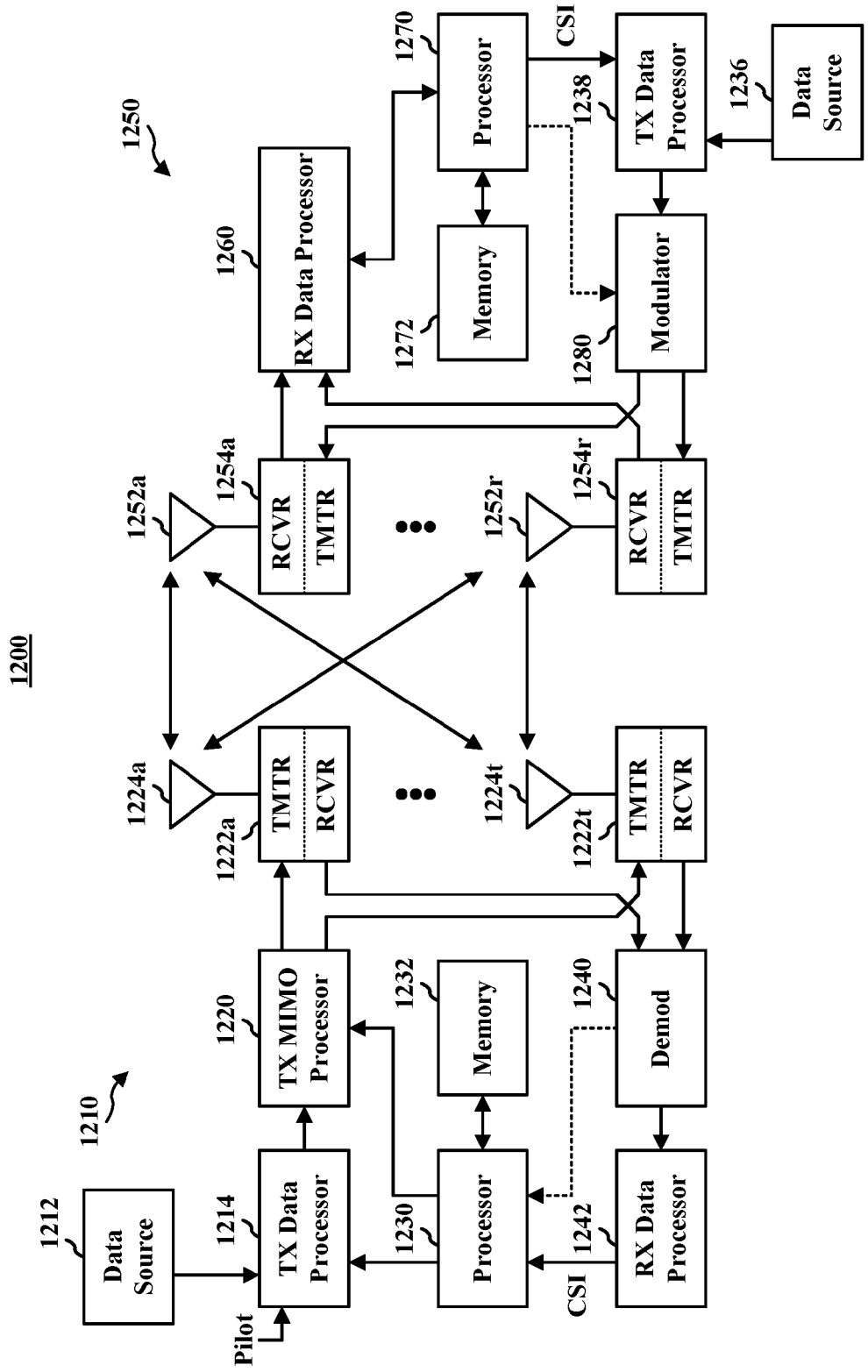
FIG. 12 is an illustration of an example wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1-7, 10-11 and 13-14) and/or methods (FIGS. 8-9) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230. Memory 1232 can store program code, data, and other information used by processor 1230 or other components of base station 1210.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which precoding matrix to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which precoding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
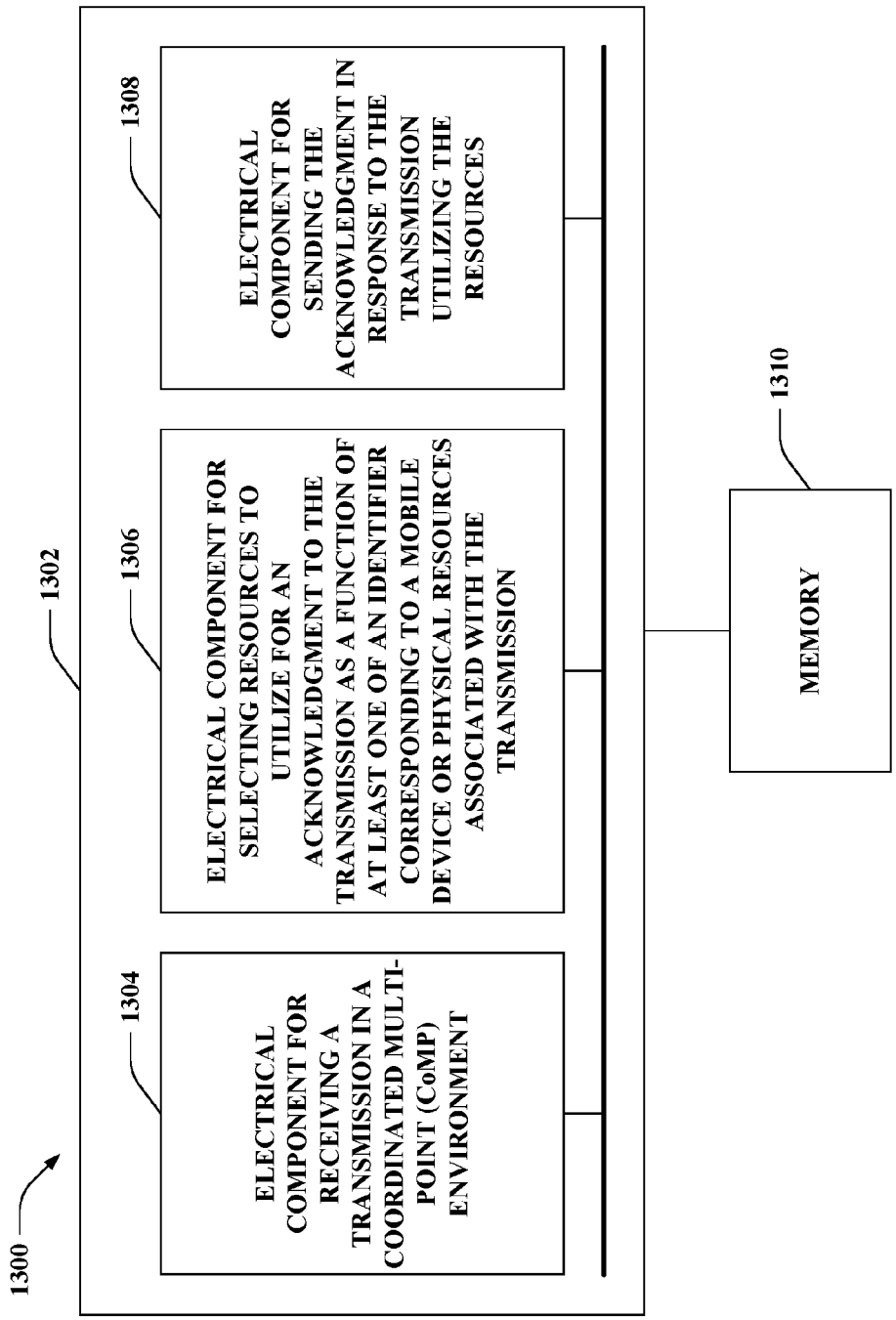
FIG. 13 is an illustration of an example system that enables generating acknowledgments in a wireless communication environment.

With reference to FIG. 13, illustrated is a system 1300 that enables generating acknowledgments in a wireless communication environment. For example, system 1300 can reside at least partially within a base station. According to another example, system 1300 can reside within a mobile device. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for receiving a transmission in a coordinated multi-point (CoMP) environment 1304. Moreover, logical grouping 1302 can include an electrical component for selecting resources to utilize for an acknowledgment to the transmission as a function of at least one of an identifier corresponding to a mobile device or physical resources associated with the transmission 1306. Further, logical grouping 1302 can include an electrical component for sending the acknowledgment in response to the transmission utilizing the resources 1308. Additionally, system 1300 can include a memory 1310 that retains instructions for executing functions associated with electrical components 1304, 1306, and 1308. While shown as being external to memory 1310, it is to be understood that one or more of electrical components 1304, 1306, and 1308 can exist within memory 1310.

Figure 14:
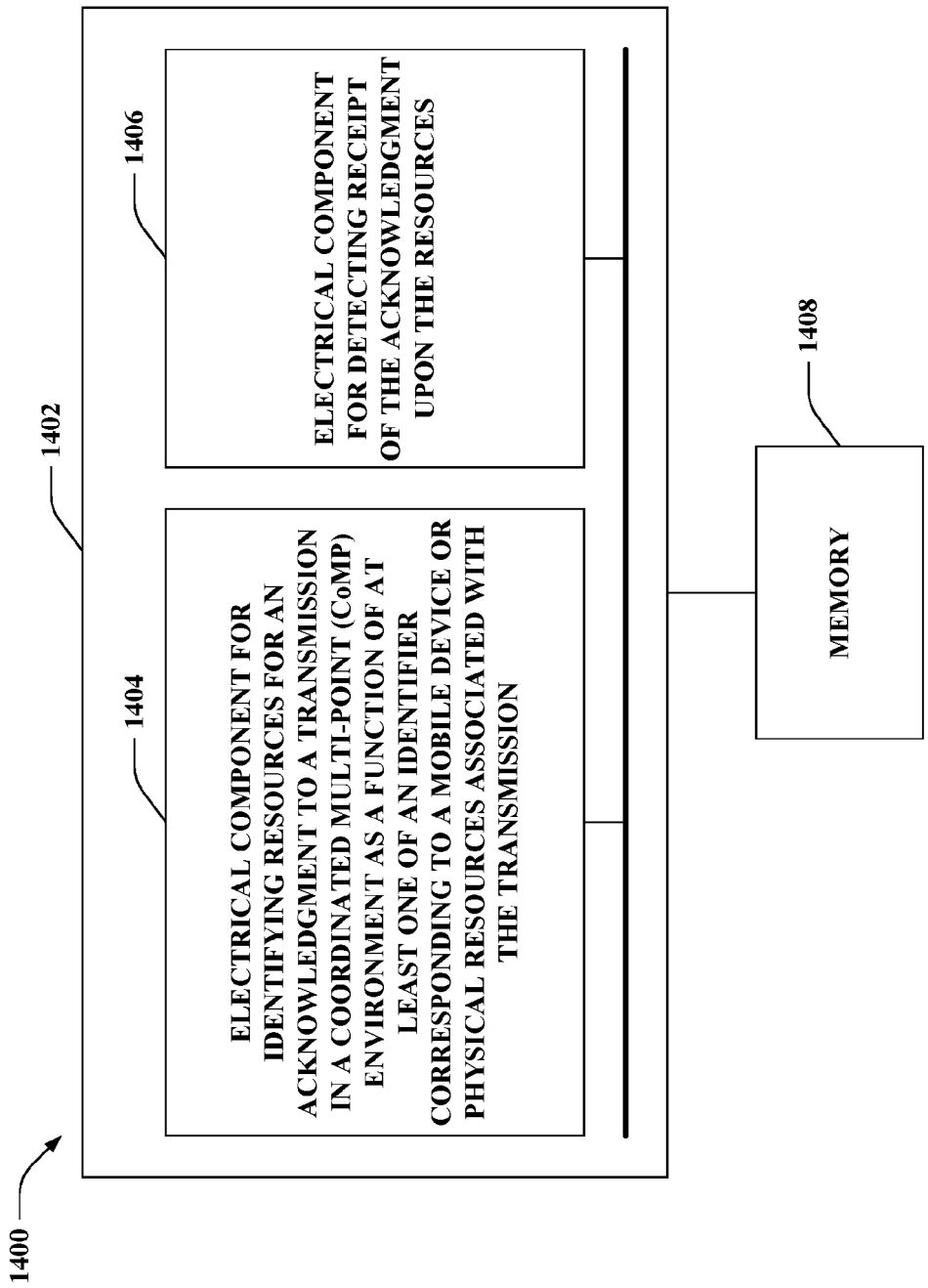
FIG. 14 is an illustration of an example system that enables monitoring a channel for acknowledgments in a wireless communication environment.

With reference to FIG. 14, illustrated is a system 1400 that enables monitoring a channel for acknowledgments in a wireless communication environment. For example, system 1400 can reside at least partially within a base station. According to another example, system 1300 can reside within a mobile device. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for identifying resources for an acknowledgment to a transmission in a coordinated multi-point (CoMP) environment as a function of at least one of an identifier corresponding to a mobile device or physical resources associated with the transmission 1404. Moreover, logical grouping 1402 can include an electrical component for detecting receipt of the acknowledgment upon the resources 1406. Additionally, system 1400 can include a memory 1408 that retains instructions for executing functions associated with electrical components 1404 and 1406. While shown as being external to memory 1408, it is to be understood that one or more of electrical components 1404 and 1406 can exist within memory 1408.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method, comprising:
    identifying, based upon an identifier, physical resources for transmission of a hybrid automatic repeat request (HARQ) acknowledgment, wherein the HARQ acknowledgment is in response to a received transmission within a coordinated multi-point (CoMP) environment, wherein the identifier maps to the identified physical resources, and wherein a cooperation technique is implemented in the CoMP environment, wherein the cooperation technique is one or more of joint transmission via inter-site packet sharing, cooperative beamforming, or cooperative silence; and
    exchanging the HARQ acknowledgment between a mobile device and a non-anchor cell base station in response to the received transmission via the identified physical resources.

2. The method claim 1, wherein the cooperation technique is implemented within a cluster in the CoMP environment, and the cluster includes a set of base stations and a set of mobile devices.

3. The method of claim 2, wherein the identifier maps to a set of resources which can be utilized for transmitting the acknowledgment within the cluster.

4. The method of claim 1, wherein the identifier maps to a predetermined set of physical resources.

5. The method of claim 1, wherein physical resources corresponding to the received transmission are scheduled by an anchor cell base station.

6. The method of claim 1, wherein physical resources corresponding to the received transmission are identifiable to the non-anchor cell base station when an anchor cell base station indicates scheduling the physical resources corresponding to the received transmission to the non-anchor cell base station when implementing the cooperation technique.

7. The method of claim 1, further comprising:
    obtaining the received transmission over a downlink; and
    sending the HARQ acknowledgment over an uplink.

8. The method of claim 1, further comprising:
    obtaining the received transmission over an uplink; and
    sending the HARQ acknowledgment over a downlink.

9. The method of claim 8, further comprising utilizing a dedicated reference signal for the HARQ acknowledgment sent over the downlink.

10. The method of claim 8, further comprising sending the HARQ acknowledgment over the downlink from the non-anchor cell base station.

11. A wireless communications apparatus, comprising: at least one processor; and
    a memory coupled to the at least one processor, wherein the at least one processor is configured to:
        receive a transmission in a coordinated multi-point (COMP) environment;
        identify, based upon an identifier, physical resources for transmission of a hybrid automatic repeat request (HARQ) acknowledgment, wherein the HARQ acknowledgment is responsive to the transmission, wherein the identifier maps to the identified physical resources, and wherein a cooperation technique is implemented in the CoMP environment, wherein the cooperation technique is one or more of joint transmission via inter-site packet sharing, cooperative beamforming, or cooperative silence; and
        exchange the HARQ acknowledgment between a mobile device and a non-anchor cell base station employing the identified physical resources.

12. The wireless communications apparatus of claim 11, wherein physical resources corresponding to the received transmission are identifiable to the non-anchor cell base station via an anchor cell base station indicating the physical resources corresponding to the received transmission as scheduled to the non-anchor cell base station when implementing the cooperation technique.

13. The apparatus of claim 11, wherein the at least one processor is further configured to:
    obtain the received transmission over a downlink; and
    send the HARQ acknowledgment over an uplink.

14. The apparatus of claim 11, wherein the at least one processor is further configured to:
    obtain the received transmission over an uplink; and
    send the HARQ acknowledgment over a downlink.

15. An apparatus, comprising:
    means for receiving a transmission in a coordinated multi-point (COMP) environment;
    means for selecting, based upon an identifier, physical resources to utilize for transmission of a hybrid automatic repeat request (HARQ) acknowledgment, wherein the HARQ acknowledgment is in response to the transmission, wherein the identifier maps to the identified physical resources, and wherein a cooperation technique is implemented in the CoMP environment, wherein the cooperation technique is one or more of joint transmission via inter-site packet sharing, cooperative beamforming, or cooperative silence; and
    means for exchanging the HARQ acknowledgment between a mobile device and a non-anchor cell base station in response to the transmission utilizing the selected physical resources.

16. The apparatus of claim 15, wherein physical resources corresponding to the received transmission are identifiable to the non-anchor cell base station via an anchor cell base station indicating the physical resources corresponding to the received transmission as scheduled to the non-anchor cell base station when implementing the cooperation technique in the CoMP environment.

17. The apparatus of claim 15, further comprising:
    means for obtaining the received transmission over a downlink; and
    means for sending the HARQ acknowledgment over an uplink.

18. The apparatus of claim 15, further comprising:
    means for obtaining the received transmission over an uplink; and means for sending the HARQ acknowledgment over a downlink.

19. A computer program product, comprising:
a non-transitory computer-readable medium comprising:
code for causing at least one computer to receive a transmission in a coordinated multi-point (CoMP) environment that employs a cooperation technique;
code for causing the at least one computer to select, based upon an identifier, physical resources to utilize for transmission of a hybrid automatic repeat request (HARQ) acknowledgment, wherein the HARQ acknowledgment is in response to the transmission, wherein the identifier maps to the identified physical resources, and wherein a cooperation technique is implemented in the CoMP environment, wherein the cooperation technique is one or more of joint transmission via inter-site packet sharing, cooperative beamforming, or cooperative silence; and
code for causing the at least one computer to exchange the HARQ acknowledgment between a mobile device and a non-anchor cell base station in response to the transmission utilizing the selected physical resources.

20. The computer program product of claim 19, wherein physical resources corresponding to the received transmission are identifiable to the non-anchor cell base station via an anchor cell base station indicating the physical resources corresponding to the received transmission as scheduled to the non-anchor cell base station when implementing the cooperation technique in the CoMP environment.

21. An apparatus, comprising:
a reception component that monitors a channel for a transmission;
a resource selection component that chooses, based upon an identifier, physical resources for transmission of a hybrid automatic repeat request (HARQ) acknowledgment responsive to the transmission in a coordinated multi-point (CoMP) environment, wherein the identifier maps to the identified physical resources, and wherein a cooperation technique is implemented in the CoMP environment, wherein the cooperation technique is one or more of joint transmission via inter-site packet sharing, cooperative beamforming, or cooperative silence; and
an acknowledgment transmission component that exchanges the HARQ acknowledgment between a mobile device and a non-anchor cell base station by employing the chosen physical resources.

22. A method, comprising:
recognizing physical resources, based upon an identifier, for transmission of a hybrid automatic repeat request (HARQ) acknowledgment, wherein the HARQ acknowledgment is in response to a received transmission within a coordinated multi-point (COMP) environment, wherein the identifier maps to the identified physical resources, and wherein a cooperation technique is implemented in the CoMP environment, wherein the cooperation technique is one or more of joint transmission via inter-site packet sharing, cooperative beamforming, or cooperative silence; and
monitoring the recognized physical resources to detect the HARQ acknowledgment exchanged between a mobile device and a non-anchor cell base station.

23. The method claim 22, wherein the cooperation technique is implemented within a cluster in the CoMP environment, and the cluster includes a set of base stations and a set of mobile devices.

24. The method of claim 23, wherein the identifier maps to a set of resources which can be utilized for transmitting the acknowledgment within the cluster.

25. The method of claim 22, wherein physical resources corresponding to the received transmission are identifiable to the non-anchor cell base station when an anchor cell base station indicates the physical resources corresponding to the received transmission as scheduled to the non-anchor cell base station when implementing the cooperation technique.

26. The method of claim 22, further comprising monitoring the recognized physical resources with the non-anchor cell base station to detect the HARQ acknowledgment responsive to a transmission sent by an anchor cell base station.

27. A wireless communications apparatus, comprising:
at least one processor; and
a memory coupled to the at least one processor, wherein the at least one processor is configured to:
recognize physical resources, based upon an identifier, for transmission of a hybrid automatic repeat request (HARQ) acknowledgment, wherein the HARQ acknowledgment is in response to a received transmission within a coordinated multi-point (COMP) environment, wherein the identifier maps to the identified physical resources, and wherein a cooperation technique is implemented in the CoMP environment, wherein the cooperation technique is one or more of joint transmission via inter-site packet sharing, cooperative beamforming, or cooperative silence; and
detect the HARQ acknowledgment exchanged between a mobile device and a non-anchor cell base station upon the recognized physical resources.

28. An apparatus, comprising:
means for identifying physical resources, based upon an identifier, for transmission of a hybrid automatic repeat request (HARQ) acknowledgment, wherein the HARQ acknowledgment is in response to a transmission in a coordinated multi-point (COMP) environment, wherein the identifier maps to the identified physical resources, and wherein a cooperation technique is implemented in the CoMP environment, wherein the cooperation technique is one or more of joint transmission via inter-site packet sharing, cooperative beamforming, or cooperative silence; and
means for detecting receipt of the HARQ acknowledgment exchanged between a mobile device and a non-anchor cell base station upon the identified physical resources.

29. A computer program product, comprising:
a non-transitory computer-readable medium comprising:
code for causing at least one computer to recognize physical resources, based upon an identifier, for transmission of a hybrid automatic repeat request (HARQ) acknowledgment, wherein the HARQ acknowledgment is in response to a transmission in a coordinated multi-point (COMP) environment that employs a cooperation technique, wherein the identifier maps to the identified physical resources, and wherein a cooperation technique is implemented in the CoMP environment, wherein the cooperation technique is one or more of joint transmission via inter-site packet sharing, cooperative beamforming, or cooperative silence; and
code for causing the at least one computer to detect receipt of the HARQ acknowledgment exchanged between a mobile device and a non-anchor cell base station upon the recognized physical resources.

30. An apparatus, comprising:
a cooperation component that coordinates operation with at least one disparate base station to effectuate one or more of joint transmission via inter-site packet sharing, cooperative beamforming, or cooperative silence in a coordinated multi-point (COMP) environment; and
an acknowledgment demodulation component that recognizes physical resources, based upon an identifier, for transmission of a hybrid automatic repeat request (HARQ) acknowledgment in response to a received transmission, wherein the identifier maps to the identified physical resources, and wherein a cooperation technique is implemented in the CoMP environment, wherein the cooperation technique is one or more of joint transmission via inter-site packet sharing, cooperative beamforming, or cooperative silence, and observes the recognized physical resources to recognize whether the HARQ acknowledgment exchanged between a mobile device and a non-anchor cell base station is received upon the recognized physical resources.

\* \* \* \* \*